(12) United States Patent
Kihara et al.

(10) Patent No.: US 11,390,211 B2
(45) Date of Patent: Jul. 19, 2022

(54) STEERING WHEEL

(71) Applicant: TOYODA GOSEI CO., LTD., Kiyosu (JP)

(72) Inventors: Hisanori Kihara, Kiyosu (JP); Bunpei Morita, Kiyosu (JP); Sayaka Sakakibara, Kiyosu (JP); Fumiyasu Kojima, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/133,752

(22) Filed: Dec. 24, 2020

(65) Prior Publication Data

US 2021/0221285 A1    Jul. 22, 2021

(30) Foreign Application Priority Data

Jan. 17, 2020   (JP) .............................. JP2020-006200
Aug. 11, 2020   (JP) .............................. JP2020-135991

(51) Int. Cl.
*B60Q 3/283*     (2017.01)
*B60K 35/00*     (2006.01)
(Continued)

(52) U.S. Cl.
CPC .............. *B60Q 3/283* (2017.02); *B60K 35/00* (2013.01); *B60Q 3/62* (2017.02); *B62D 1/065* (2013.01);
(Continued)

(58) Field of Classification Search
CPC . B60Q 3/283; B60Q 3/62; B60Q 3/64; B60Q 3/66; B60Q 3/78; B60K 35/00; B60K 2370/178; B60K 2370/336; B60K 2370/332; B60K 2370/338; B60K 2370/782; B62D 1/065; B62D 1/04; B62D 1/046; B62D 1/06; F21V 2200/00; F21V 2200/10; F21V 2200/13; F21V 33/00;
(Continued)

(56) References Cited

U.S. PATENT DOCUMENTS 9,821,703 B2 * 11/2017 Lisseman ............... B60K 35/00
10,071,684 B2 * 9/2018 Gascón Rivera ...... B60Q 3/283
(Continued)

FOREIGN PATENT DOCUMENTS

JP        2016-501760 A    1/2016
JP        2017-529272 A    10/2017

*Primary Examiner* — Bao Q Truong
(74) *Attorney, Agent, or Firm* — Posz Law Group, PLC

(57) ABSTRACT

A light bar mounted on a steering wheel includes a holding member, a substrate, a plurality of visible light sources, a plurality of infrared light sources, and a light guiding element. The holding member includes a radiating opening. The substrate is held by the holding member in such a manner that a gap is formed between a first end in a width direction of the substrate and one of side walls of the holding member. The infrared light sources are mounted and arranged on a front surface of the substrate generally along a length direction of the substrate for emitting infrared light toward the driver. The visible light sources are mounted and arranged on a back surface of the substrate generally along the length direction of the substrate. The light guiding element is configured to deflect visible light emitted from the visible light sources toward the radiating opening.

13 Claims, 21 Drawing Sheets

(51) Int. Cl.
 *B62D 1/06* (2006.01)
 *B60Q 3/62* (2017.01)
 *F21V 8/00* (2006.01)

(52) U.S. Cl.
 CPC ...... *G02B 6/0008* (2013.01); *B60K 2370/178* (2019.05); *B60K 2370/332* (2019.05); *B60K 2370/336* (2019.05); *B60K 2370/338* (2019.05); *F21V 2200/13* (2015.01)

(58) Field of Classification Search
 CPC ...... G02B 6/00; G02B 6/0001; G02B 6/0005; G02B 6/0008; F21Y 2115/10
 See application file for complete search history.

(56) References Cited

U.S. PATENT DOCUMENTS

| | | |
|---|---|---|
| 2014/0111324 A1 | 4/2014 | Lisseman et al. |
| 2016/0025281 A1 | 1/2016 | Gardner et al. |
| 2016/0200343 A1 | 7/2016 | Lisseman et al. |
| 2018/0118089 A1 | 5/2018 | Lisseman et al. |
| 2018/0237050 A1 | 8/2018 | Gardner et al. |
| 2019/0016383 A1* | 1/2019 | Spencer ................ B60Q 3/283 |

* cited by examiner

FIG. 6
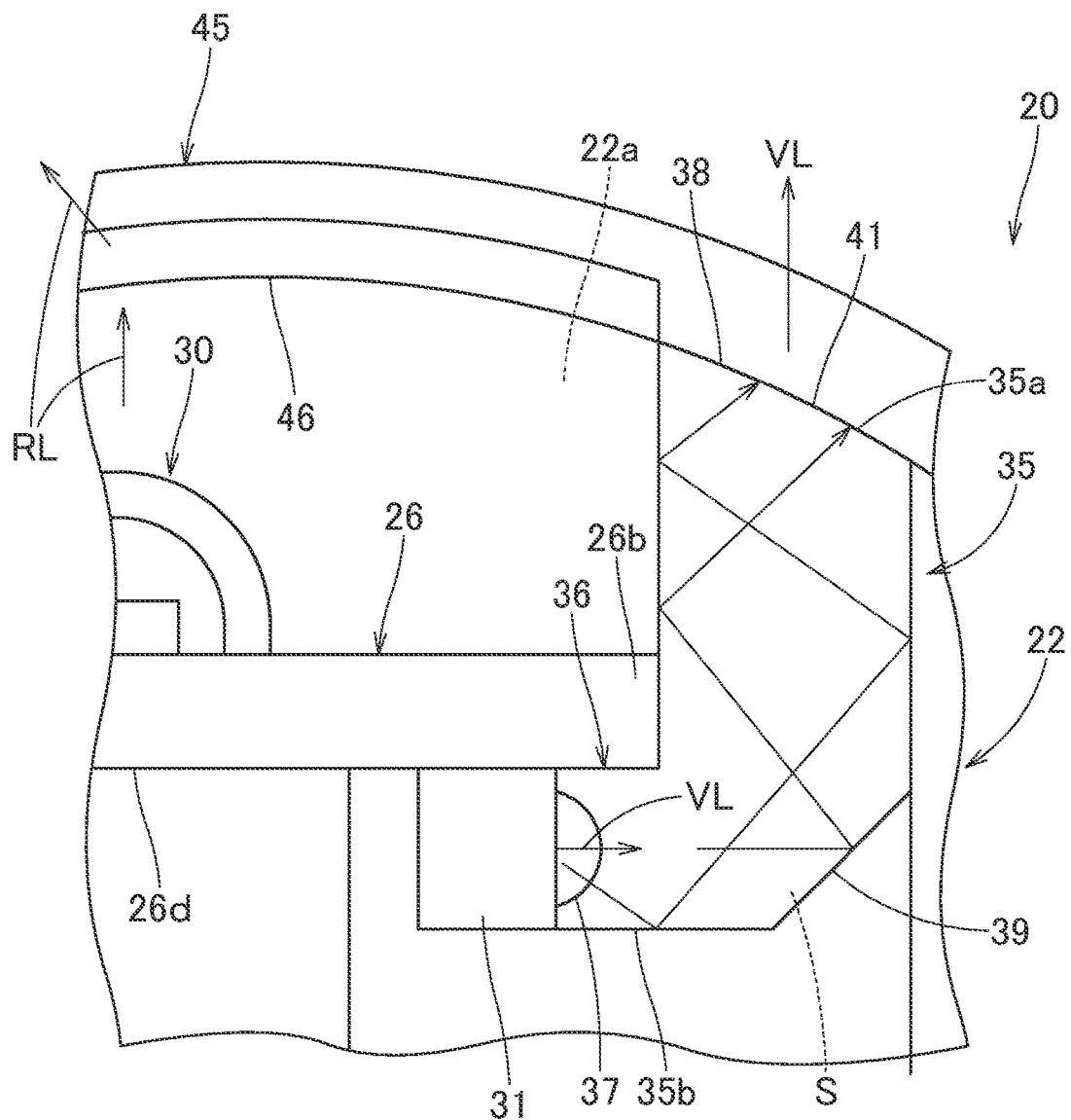
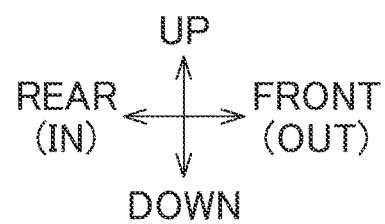

STEERING WHEEL

CROSS REFERENCE TO RELATED APPLICATIONS

The present application claims priority from Japanese Patent Application No. 2020-006200 of Kihara et al., filed on Jan. 17, 2020 and Japanese Patent Application No. 2020-135991 of Kihara et al., filed on Aug. 11, 2020, the entire disclosures of which are incorporated herein by reference.

BACKGROUND

1. Technical Field

The invention relates to a steering wheel provided with a light bar at a position visible to the driver.

2. Description of Related Art

JP 2017-529272A discloses a steering wheel that is provided with a light bar on an upper surface of a grip facing towards the driver. In this steering wheel, the light bar includes a case and a substrate stored and held inside the case. A plurality of visible light sources and a plurality of infrared light sources are arranged generally along a length direction of the substrate. More specifically, the visible light sources and the infrared light sources are both disposed on a front (or upper) surface of the substrate so as to emit visible light and infrared light respectively upward, i.e. towards the driver. The visible light sources are disposed in a central area in the length direction of the substrate, and the infrared light sources are disposed in opposite end areas of the substrate.

In the steering wheel disclosed in the above literature, the visible light sources and the infrared light sources are disposed in separate areas in the length direction of the light bar. In other words, the area where the visible light sources are disposed and the area where the infrared light sources are disposed do not overlap in the length direction of the light bar. Such arrangement of the visible light sources and infrared light sources leads to an increase of length of the light bar. In order to shorten the length of the light bar, it is conceivable to move the area where the visible light sources are disposed and/or the area where the infrared light sources are disposed in a width direction of the light bar and make the two areas overlap in the width direction of the light bar. However, this configuration would increase the widths of the substrate and the light bar instead, and the light bar with the increased width would possibly not be able to be mounted on the grip of a steering wheel having a limited space for accommodating the light bar. In the steering wheel disclosed in the above literature, furthermore, since the visible light sources are disposed on the front (or upper) surface of the substrate, a distance between the visible light sources and a surface of an outer lens which actually lets out the visible light is short. It follows that an optical path for diffusing the visible light emitted from the visible light sources is not long enough for diffusing the visible light sufficiently.

SUMMARY

A steering wheel according to an aspect of the present disclosure includes a light bar at a position visible to a driver. The light bar includes a holding member that includes a pair of side walls and a radiating opening formed between first end portions of the side walls; a substrate that is stored and held inside the holding member generally in parallel to an opening surface of the radiating opening in such a manner that a gap is formed between a first end in a width direction of the substrate and one of the side walls of the holding member, the substrate including a front surface facing towards the radiating opening and a back surface facing away from the radiating opening; a plurality of infrared light sources that are mounted and arranged on the front surface of the substrate generally along a length direction of the substrate for emitting infrared light toward the driver via the radiating opening when actuated; a plurality of visible light sources that are mounted and arranged on the back surface of the substrate generally along the length direction of the substrate for emitting visible light when actuated; and a light guiding element that is configured to deflect the visible light emitted from the visible light sources toward the radiating opening so that the visible light is radiated from the radiating opening, the light guiding element extending from a side of the back surface to a side of the front surface of the substrate via the gap.

A steering wheel according to another aspect of the present disclosure includes a light bar at a position visible to a driver. The light bar includes a holding member that includes a radiating opening; a substrate that is held by the holding member generally in parallel to an opening surface of the radiating opening, the substrate including a front surface facing towards the radiating opening and a back surface facing away from the radiating opening; a plurality of visible light sources that are mounted and arranged on the back surface of the substrate generally along a length direction of the substrate for emitting visible light when actuated; and a light guiding element that is configured to deflect the visible light emitted from the visible light sources toward the radiating opening so that the visible light is radiated from the radiating opening, the light guiding element including a light-source-side portion that is disposed in a vicinity of the visible light sources in a side of the back surface of the substrate, and an opening-side portion that intersects with the light-source-side portion and extends from the side of the back surface to a side of the front surface of the substrate, thus the light guiding element having a generally L cross-sectional shape.

BRIEF DESCRIPTION OF DRAWINGS

FIG. 6 is a schematic partial enlarged sectional view of the steering wheel in accordance with the first exemplary embodiment showing a vicinity of the light guiding element.

DETAILED DESCRIPTION

Various exemplary embodiments of the invention are described below with reference to the accompanying drawings. However, the invention is not limited to the embodiments disclosed herein. All modifications within the appended claims and equivalents relative thereto are intended to be encompassed in the scope of the claims.

Figure 1:
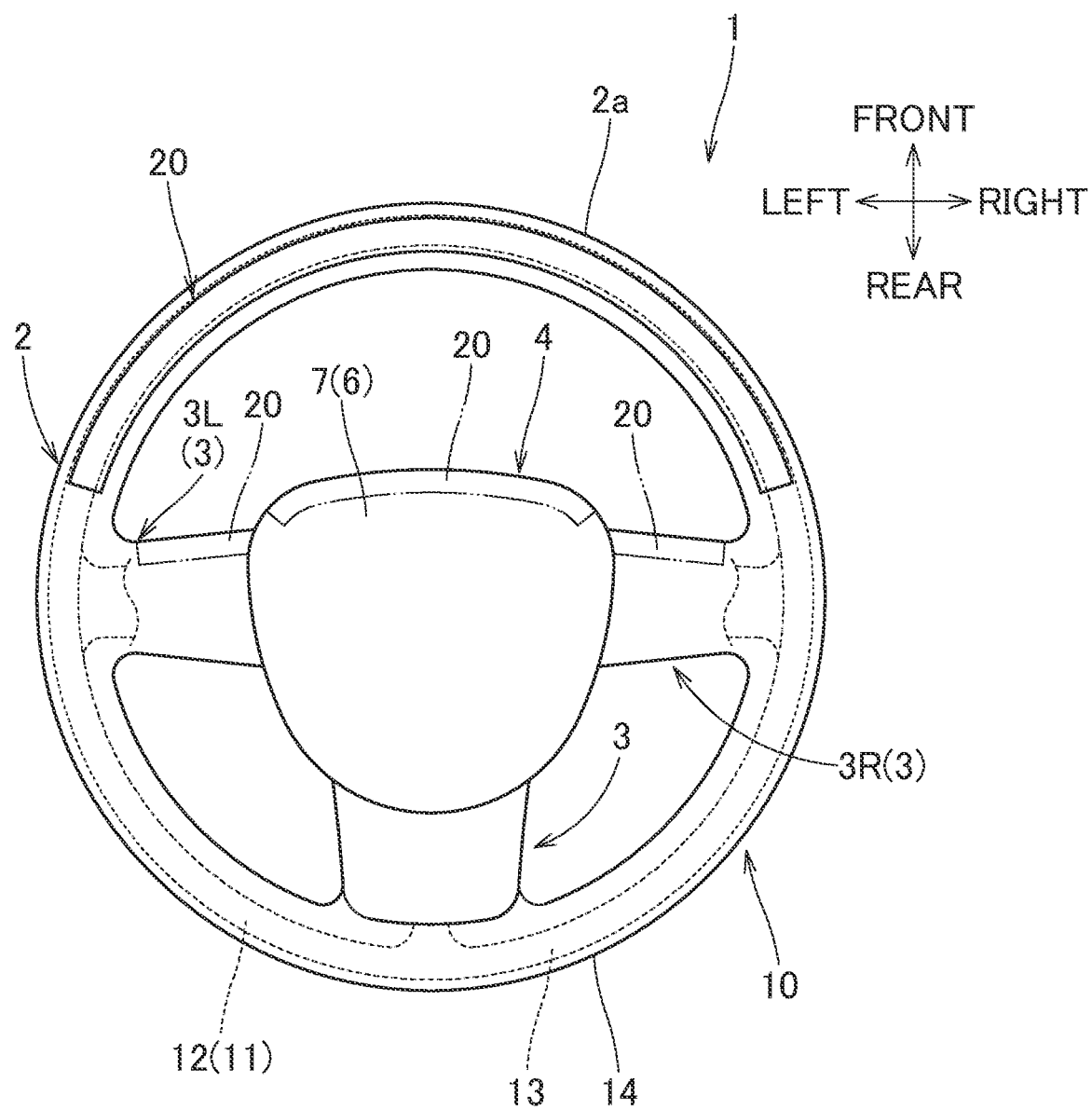
FIG. 1 is a plan view of a steering wheel in accordance with a first exemplary embodiment.

As can be seen in FIG. 1, a steering wheel 1 according to a first exemplary embodiment includes a circular ring-shaped rim portion (as a grip) 2 which is adapted to be gripped for steering operation, a boss section 4 which is disposed generally at the center of the rim portion 2, and a plurality of (three, in this specific embodiment) spokes 3 which interconnect the rim portion 2 and the boss section 4. In terms of constituent parts, the steering wheel 1 includes an airbag device 6 mounted on the boss section 4, a light bar 20 disposed in the rim portion 2, and a steering wheel body 10.

Unless otherwise specified, front and rear, up and down, and left and right directions in this description are based on the steering wheel 1 as mounted on a vehicle and steered straight ahead. Thus the up and down direction refers to a direction extending along a central axial of rotation of the rim portion 2, the front and rear direction refers to a direction which is orthogonal to the central axis of rotation of the rim portion 2 and extends generally along a front and rear direction of the vehicle, and the left and right direction refers to a direction which is orthogonal to the central axis of rotation of the rim portion 2 and extends generally along a left and right direction of the vehicle.

The airbag device 6 mounted on the boss section 4 includes a not-shown airbag in a folded-up configuration, a not-shown inflator for supplying the airbag with an inflation gas, and a pad 7 which covers an upper side of the airbag. As can be seen in FIG. 1, the pad 7 covers an entire upper side of the boss section 4.

Figure 3:
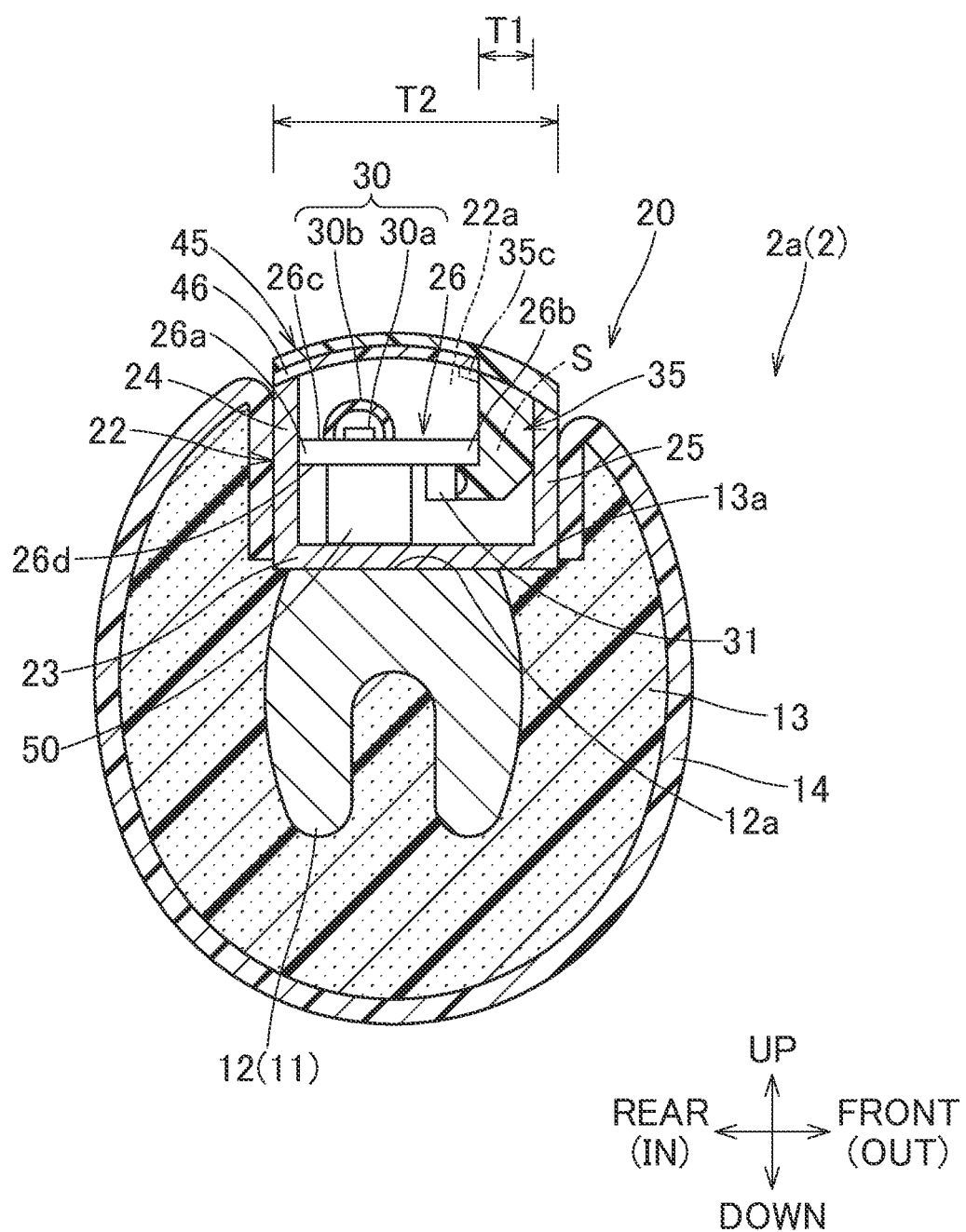
FIG. 3 is a cross-sectional view of the steering wheel of FIG. 1, taken along line III-III of FIG. 2.

As can be seen in FIGS. 1 and 3, the steering wheel body 10 includes a core 11 which has such a shape that the rim portion 2, the boss section 4 and the spokes 3 are interconnected, a cladding layer 13 which covers the core 11 on the rim portion 2 and the spokes 3, an outer skin layer 14 which covers the rim portion 2 from above the cladding layer 13, and a not-shown lower cover which covers an underside of the boss section 4.

The core 11 is made from such metal as aluminum alloy. The core 11 includes a rim core region 12 which is disposed at the rim portion 2. As can be seen in FIG. 3, the rim core region 12 generally has an inverse U shaped sectional shape. More specifically, the rim core region 12 of this specific embodiment has a flat upper surface 12a so as to be brought into contact with a bottom wall 23 of a later-described case 22 of the light bar 20 by a large area.

The cladding layer 13 is made from soft synthetic resin having cushioning property. The cladding layer 13 of this specific embodiment is made from soft foam material such as foamed polyurethane. As can be seen in FIG. 3, in the rim portion 2, the cladding layer 13 covers an outer circumference of the rim core region 12 of the core 11. The cladding layer 13 has a generally oval sectional shape. The cladding layer 13 includes, in its region where the light bar 20 is mounted, a sunken region 13a for receiving the light bar 20, i.e. the case 22 (FIG. 3). The outer skin layer 14 wraps the cladding layer 13 except the region where the light bar 20 is disposed. The outer skin layer 14 of this specific embodiment is formed of synthetic resin sheet material, natural leather, or synthetic leather.

Figure 2:
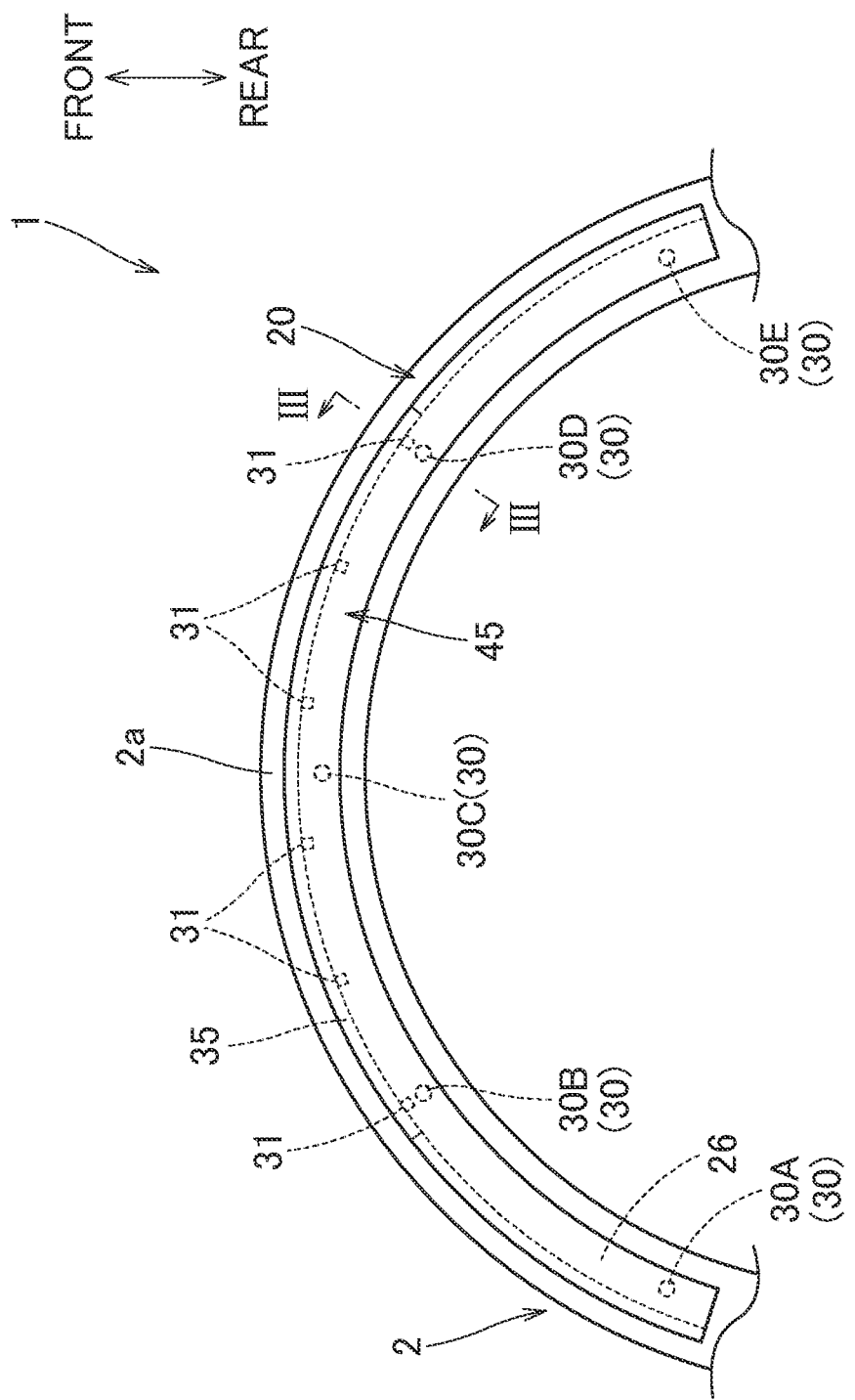
FIG. 2 is a partial enlarged plan view of the steering wheel of FIG. 1 showing a portion where a light bar is mounted.

The light bar 20 is disposed at a position in the steering wheel 1 visible to a not-shown driver of the vehicle. As can be seen in FIGS. 1 and 2, the light bar 20 of this embodiment is disposed on an upper side of a front portion 2a of the rim portion 2 between the left and right spokes 3L, 3R. More specifically, the light bar 20 of this embodiment is formed into a generally curved band shape elongated generally along a circumferential direction of the rim portion 2, as viewed from above. The light bar 20 is continuously arranged in an approximately one third area of the rim portion 2 such that the center in the length direction generally coincides with a front end of the rim portion 2.

Figure 4:
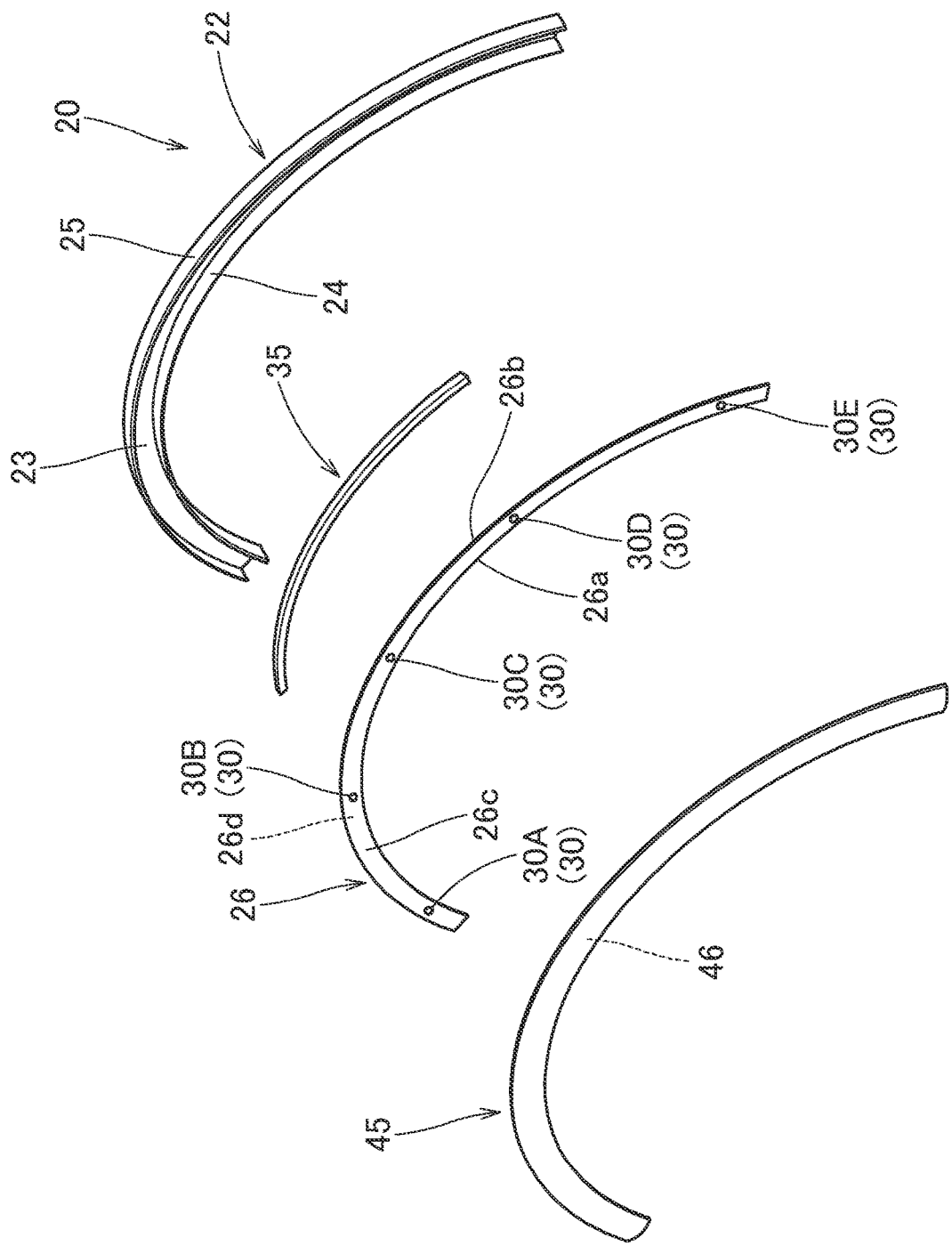
FIG. 4 is a schematic perspective exploded view of the light bar mounted in the steering wheel of FIG. 1, showing a case, a substrate, a light guiding element, and a cover.

As can be seen in FIGS. 2 to 4, the light bar 20 includes a case 22 as a holding member, a substrate 26 which is stored and held inside the case 22, a plurality of visible light sources (visible LEDs 31, in this embodiment) and a plurality of infrared light sources (infrared LEDs 30, in this embodiment) both of which are arranged generally along the length direction of the substrate 26, a light guiding element 35, a lens 46 which covers the infrared LEDs 30, a cover 45 which covers a later-described radiating opening 22a of the case 22.

As can be seen in FIGS. 3 and 4, the case 22 as the holding member is formed into such a shape that is open at the top and opposite ends in the length direction, curves generally along the shape of the rim portion 2 as viewed from above or below, and has a generally U sectional shape, in this embodiment. The case 22 of this embodiment is made from such metal as aluminum alloy. More specifically, the case 22 includes a bottom wall 23 which is generally formed into a curved band shape, an inner side wall 24 which extends upward from an inner or rear edge of the bottom wall 23, an outer side wall 25 which extends upward from an outer or front edge of the bottom wall 23, and a radiating opening 22a which is disposed in a vicinity of upper ends of the inner side wall 24 and outer side wall 25 for radiating visible light VL or infrared light RL. In this embodiment, the case 22 is arranged so that the bottom wall 23 is in contact with the upper surface 12a of the rim core region 12 of the core 11, as can be seen in FIG. 3.

The substrate 26 is arranged inside the case 22 generally in parallel to an opening surface of the radiating opening 22a. More specifically, the substrate 26 is arranged generally in parallel to the bottom wall 23 of the case 22, along the front and rear direction. As can be seen in FIGS. 3 and 4, the substrate 26 is formed generally into a curved band shape elongated generally along the case 22, i.e. the rim portion 2. As can be seen in FIGS. 2 and 4, the substrate 26 of this embodiment is arranged over a generally entire area of a length direction of the case 22. The substrate 26 is held by the case 22 such that a gap S is formed between its outer end 26b, which is a first end in the width direction (or a front end in a far-side from the center of the rim portion 2), and the outer side wall (as a side wall) 25 of the case 22, while its inner end 26a, which is a second end in the width direction (or a rear end closer to the center of the rim portion 2), is connected to the inner side wall 24 of the case 22. More specifically, the substrate 26 extends outwardly (forward, as can be seen in FIG. 3) from a vicinity of a center in an up and down direction of the inner side wall 24 while leaving a void space between itself and the bottom wall 23. The substrate 26 is electrically connected to an actuating circuit 55 located in a vicinity of the boss section 4 (refer to a block diagram in FIG. 7) so that the actuation of the infrared LEDs 30 and visible LEDs 31 mounted on the substrate 26 are controlled by the actuating circuit 55.

Figure 5A:
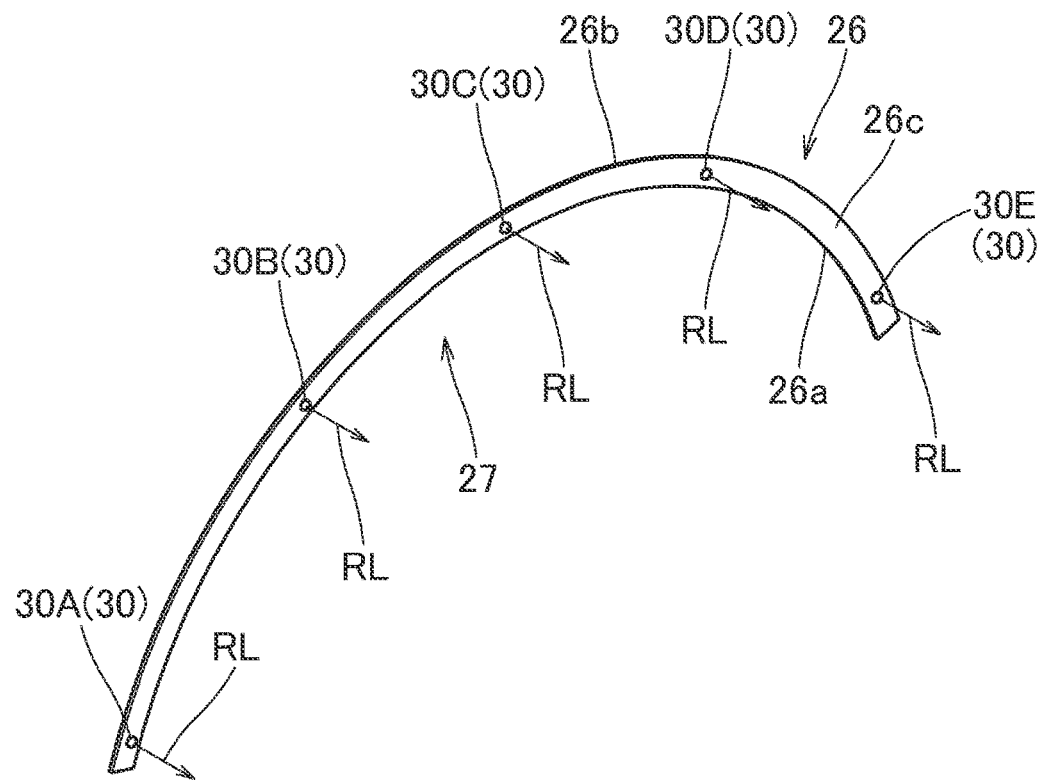
FIG. 5A is a schematic perspective view of the substrate used in the steering wheel of FIG. 1 viewed from the front side.
Figure 7:
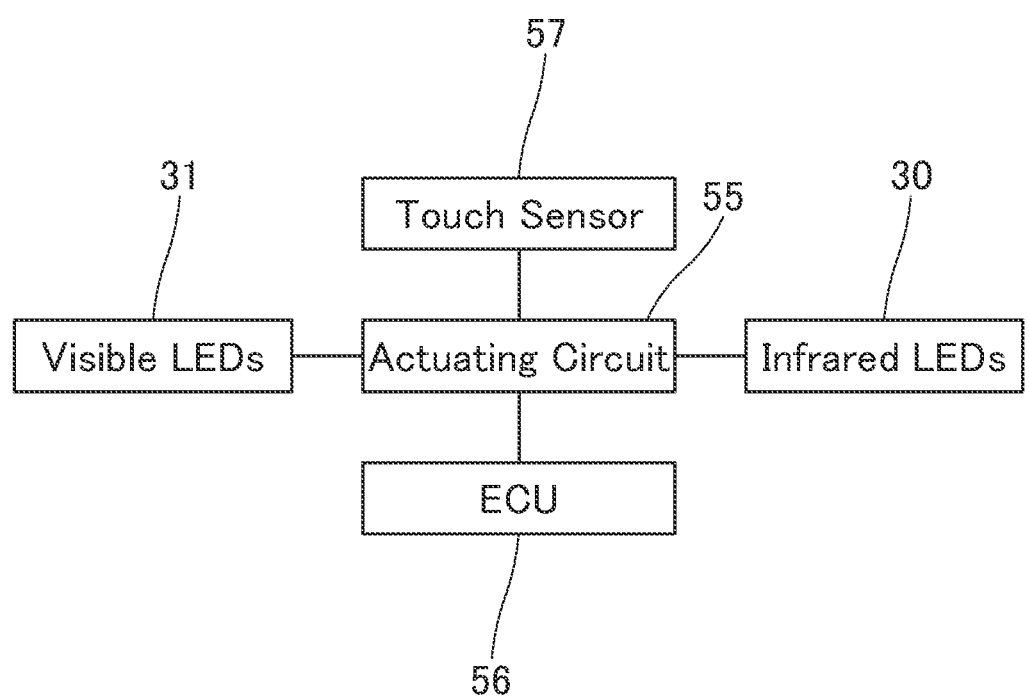
FIG. 7 is a block diagram illustrating operation of the light bar in the steering wheel accordance with the first exemplary embodiment.

In this embodiment, infrared LEDs 30 are used as the infrared light sources for emitting infrared light. The infrared LEDs 30 are arranged on a front surface (i.e. an upper surface 26c) of the substrate 26 facing towards the radiating opening 22a of the case 22, along the length direction of the substrate 26. More specifically, in this embodiment, each of the infrared LEDs 30 includes a light emitting portion 30a and a synthetic resin cover 30b covering the light emitting portion 30a, and five infrared LEDs 30 are spaced at intervals in a generally entire area in the length direction of the substrate 26, as can be seen in FIGS. 2, 4 and 5A. That is, in this embodiment, an entire upper surface 26c of the substrate 26 constitutes an infrared-LED-arrangement area 27 where the infrared LEDs 30 are arranged. The five infrared LEDs 30 (30A, 30B, 30C, 30D, 30E) are provided to assist with photographing of the face of the driver with a camera located at a predetermined position such as the boss section 4 or lower cover of the steering wheel 1, an upper surface of a not-shown steering column, an instrument panel or a ceiling of the vehicle. More specifically, the infrared LEDs 30 are configured to be lighted and emit infrared light RL towards the driver via the lens 46 to illuminate the driver's face when the camera is used to shoot an upper body, mainly face of the driver including arms. The infrared LEDs 30 of this embodiment are located at positions in the case 22 farther inward (i.e. towards the rear) than a center in an in-out direction (or in the front and rear direction) of the case 22 as can be seen in FIGS. 3 and 6 so as to be distant from the visible LEDs 31 in the in-out direction (or in the front and rear direction), as will be described later. As can be seen in FIG. 7, in this embodiment, the actuating circuit 55, which is electrically connected with an ECU 56 in electric communication with an angle sensor for detecting a steering angle of the steering wheel 1 and with a touch sensor 57 for detecting a position the driver grips in the rim portion 2, lights one of the infrared LEDs 30 (30A, 30B, 30C, 30D, 30E) which is positioned foremost in the rim portion 2 being rotated, i.e., positioned in proximity to the driver's face, so that the lighted infrared LED illuminates the driver's face with infrared light.

Figure 5B:
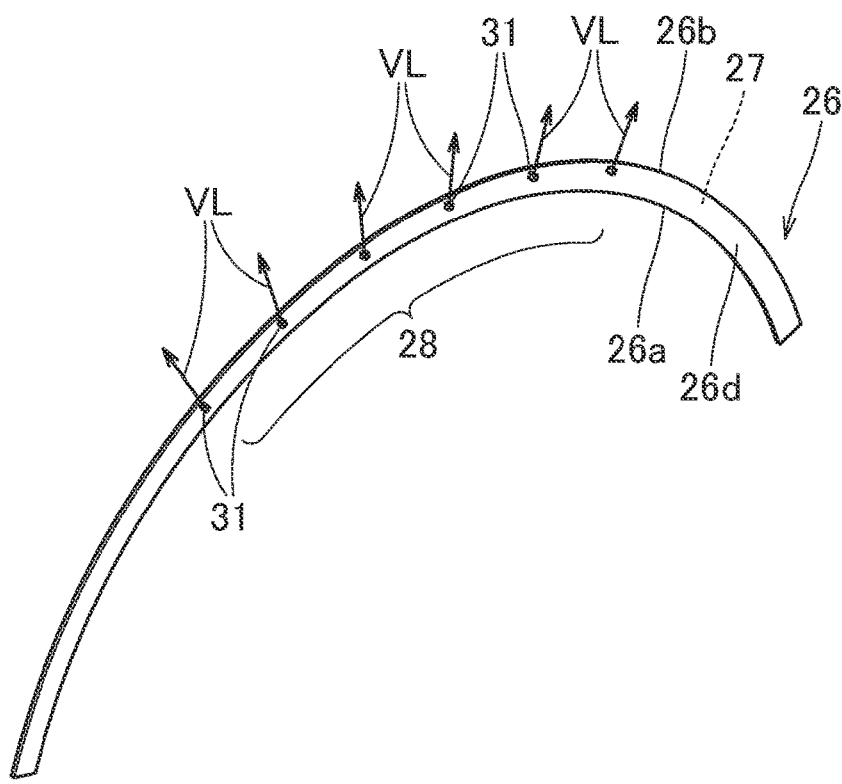
FIG. 5B is a schematic perspective view of the substrate used in the steering wheel of FIG. 1 viewed from the back side.

Visible LEDs 31 are used as the visible light sources for emitting visible light. In this embodiment, those that respectively emit red light, green light and blue light are used as the visible LEDs 31. The visible LEDs 31 are located on a back surface (i.e. lower surface 26d) of the substrate 26, in other words, on an opposite side of the infrared-LED-arrangement area 27 in the substrate 26, and arranged generally along the length direction of the substrate 26. More specifically, in this embodiment, six visible LEDs 31 are spaced at intervals in a central region in the length direction of the substrate 26, as can be seen in FIGS. 2 and 5B. Even more specifically, the visible LEDs 31 are located in a generally half area in the length direction of the substrate 26 except opposite end regions of the substrate 26. This area where the visible LEDs 31 are arranged will hereinafter be called a visible-LED-arrangement area 28. That is, distances between adjoining visible LEDs 31 are smaller than those of the infrared LEDs 30, and the visible-LED arrangement area 28 has an approximately half area of the infrared-LED-arrangement area 27 which extends over an entire area of the substrate 26 and is located on the opposite side of the infrared-LED-arrangement area 27 in the substrate 26, as can be seen in FIGS. 2, 5A and 5B. Moreover, the visible LEDs 31 of this embodiment are mounted on a vicinity of the outer end 26b of the substrate 26, which is proximate to a later-described light guiding element 35, at positions farther outward than the infrared LEDs 30. There the visible LEDs 31 are configured to emit visible light VL outwardly (or forward), i.e. towards the light guiding element 35, as can be seen in FIG. 6. The actuating circuit 55 is configured to light one or more visible LEDs 31 which is (are) located at a predetermined position(s) and configured to emit light of a predetermined color. In this specific embodiment, all the visible LEDs 31 are configured to be lit in response to an actuating signal from the actuating circuit 55. As can be seen in FIG. 6, the visible light VL emitted by the visible LEDs 31 is diffused by an entirety of the light guiding element 35 disposed outside of the visible LEDs 31 and emitted toward the radiating opening 22a from an entirety of a later-described exit surface 38 of the light guiding element 35. Then a portion of the cover 45 covering the exit surface 38 of the light guiding element 35 shines generally entirely (see FIG. 8) and warns or communicate with the driver.

The light guiding element 35 is disposed in the gap S formed between the outer end 26b of the substrate 26 and the outer side wall (as the side wall) 25 of the case 22 and extends from below to above the substrate via the gap S, in other words, extends from a lower surface 26d side to an upper surface 26c side of the substrate 26 via the gap S. The light guiding element 35 of this embodiment is arranged only at an outer side (or front side) of the visible-LED-arrangement area 28 in the substrate 26. More specifically, a length of the light guiding element 35 is generally a half of that of the substrate 26 as can be seen in FIG. 4. The light guiding element 35 is located at a front portion of the steering wheel 1 being steered ahead, as can be seen in FIG. 2. Referring to FIGS. 2 and 4, the light guiding element 35 is formed generally into a plate curved generally along the curvature of the rim portion 2 as viewed from above or below, and extending in the up and down direction. More specifically, a lower end 35b of the light guiding element 35, which is disposed toward the bottom wall 23 of the case 22, is located farther downward than the substrate 26, and an upper end 35a disposed toward the radiating opening 22a is located proximate to the cover 45. As can be seen in FIG. 6, the light guiding element 35 includes a protruding portion 36 protruding toward the visible LEDs 31 at the root portion (or in a vicinity of the lower end 35b), thus having a generally L cross-sectional shape. As can be seen in FIG. 3, the light guiding element 35 of this embodiment has a thickness T1 which is approximately one fifth of a width T2 in width direction of the case 22, the width T2 coinciding with that of the light bar 20. The light guiding element 35 is fabricated from synthetic resin such as polycarbonate resin and acrylic resin. Referring to FIG. 6, the light guiding element 35 includes a plurality of entrance planes 37 which are disposed in a distal end surface of the protruding portion 36 (i.e. in an end plane of the protruding portion 36 facing towards the visible LEDs 31) for receiving visible light VL emitted from the visible LEDs 31, an exit plane 38 which is disposed in an upper surface of the light guiding element 35 and lets the visible light VL exit upward and toward the radiating opening 22a, and a deflecting plane 39 which is disposed in a vicinity of a lower outer edge (or lower front edge) of the light guiding element 35 and farther outward than or in front of the entrance plane 37, and is configured to deflect the visible light VL having come into the entrance planes 37 upward and toward the exit plane 38. Further, each of the entrance planes 37 in this embodiment is formed into a hollow shape having a generally arcuate sectional shape, as can be seen in FIG. 6. The entrance plane 37 having such a generally arcuate sectional shape is able to diffuse the visible light emitted from the visible LEDs 31 at entrance of the light in comparison with an instance where the entrance plane is generally flat. Moreover, a diffusing layer 41 which is configured to diffuse visible light is disposed on the exit plane 38. Particularly, the diffusing layer 41 is formed by applying a texture onto the exit plane 38.

Figure 8:
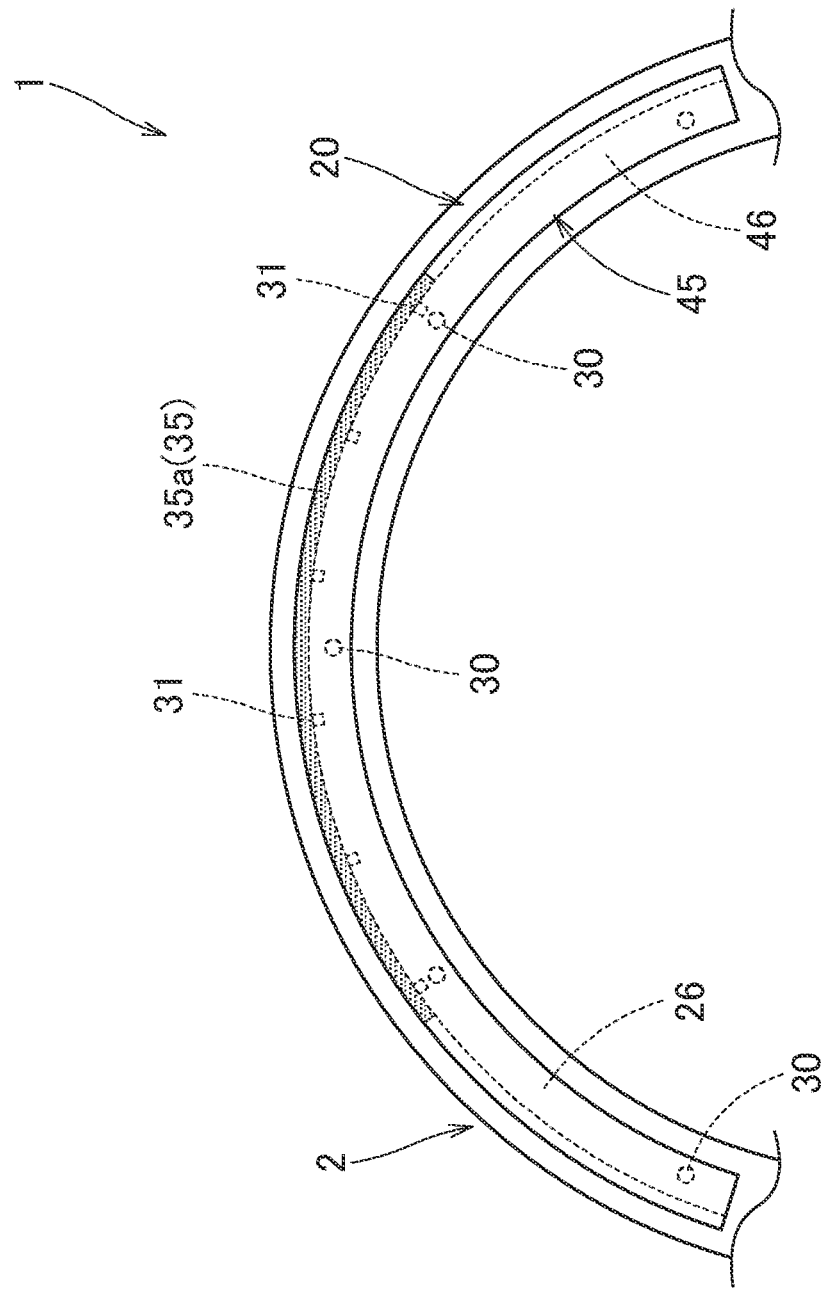
FIG. 8 is a schematic partial enlarged plan view of the steering wheel of FIG. 1 showing the light bar at lighting of visible LEDs.

In this embodiment, the lens 46, which covers the infrared LEDs 30, and the cover 45, which covers the radiating opening 22 of the case 22, are integrated. The cover 45 covers a generally entirety of the radiating opening 22a including a region above the light guiding element 35. As can be seen in FIGS. 2 and 4, the cover 45 is formed into a curved shape curving generally along the curvature of the rim portion 2 as viewed from the up and down direction, and has such a curved cross-sectional shape that continues smoothly to an outer circumferential plane of the outer skin layer 14, as can be seen in FIG. 3. So as to blend in with the black outer skin layer 14, the cover 45 of this embodiment is fabricated from black transparent synthetic resin having translucency. The cover 45 is transparent to the visible light VL emitted from the visible LEDs 31 as well as to the infrared light RL emitted from the infrared LEDs 30. The lens 46 is configured to deflect the infrared light RL emitted from the infrared LEDs 30 toward the driver. The lens 46 is disposed underneath the cover 45, at an area over the substrate 26, i.e. an area farther inward (or rearward) than the light guiding element 35 facing toward the substrate 26, as can be seen in FIG. 3. The lens 46 is configured to deflect the infrared light RL emitted from the infrared LEDs 30 toward the driver, particularly, reawardly and upwardly (or inwardly and upwardly), as can be seen in FIG. 6. The lens 46 is fabricated from black synthetic resin which is transparent only to the infrared light RL. The cover 45 and lens 46 are integrally formed by two-color molding technology from such synthetic resin as polycarbonate resin and acrylic resin. As described above, when the visible LEDs 31 are lighted, the region of the cover 45 where the lens 46 is not disposed and which covers the light guiding element 35 shines generally entirely. That is, since the light guiding element 35 is located only in front of (or on outside of) the visible-LED-arrangement area 28 and is not located in opposite end regions of the cover 45 as described above, only a central region in a front (or outer) edge region of the cover 45 shines at lighting of the visible LEDs 31, as can be seen in FIG. 8.

As can be seen in FIG. 3, the light bar 20 of this embodiment further includes, on the underside of the substrate 26 and in a region rearward (or inward) of the visible LEDs 31, a heat-transfer element 50 that fills a space between the substrate 26 and bottom wall 23 of the case 22 and contacts both of the substrate 26 and bottom wall 23. In this embodiment, the heat-transfer element 50 is used to transfer a heat generating at operation of the substrate 26 to the rim core region 12 of the core 11 via the bottom wall 23 of the case 22.

One exemplary operation of the light bar 20 of the steering wheel 1 in accordance with the first exemplary embodiment is now described. The light bar 20 of the steering wheel 1 in accordance with the first exemplary embodiment is configured to light one of the infrared LEDs 30 (30A, 30B, 30C, 30D, 30E) positioned proximate to the driver's face at predetermined intervals in order to continuously monitor the condition of the driver at driving, in response to an actuating signal from the actuating circuit 55 which is connected with the ECU 56 monitoring the steering angle of the steering wheel 1 and the position the driver grips in the rim portion 2. The lighted infrared LED 30 (30A, 30B, 30C, 30D, 30E) illuminates the upper body of the driver, mainly face, while the camera located at a predetermined position such as the boss section 4 or lower cover of the steering wheel 1, the upper surface of the not-shown steering column, the instrument panel or ceiling of the vehicle shoots the driver's face in response to an actuating signal from the actuating circuit 55. The visible LEDs 31 may be configured to be lighted for warning or communicating with the driver. More particularly, the visible LEDs 31 may be controlled such that at least one of them is lighted to emit a predetermined color(s) with a predetermined lighting/blinking pattern in response to an actuating signal from the actuating circuit, at switching between normal driving mode and autonomous driving mode in a vehicle with such a function, by way of example. If all the visible LEDs 31 are lighted, the central region in the front edge region of the cover 45 shines generally wholly as indicated with a dot pattern in FIG. 8.

In the steering wheel 1 in accordance with the first exemplary embodiment, the infrared LEDs 30 (i.e. infrared light sources) are located on the front surface (or upper surface 26c) of the substrate 26 and the visible LEDs 31 (i.e. visible light sources) are located on the back surface (or lower surface 26d) of the substrate 26, and both sets of the light sources 30, 31 are arranged along the length direction of the substrate 26 respectively on the front surface and back surface of the substrate 26. This configuration enables the area where the infrared LEDs 30 are arranged and the area where the visible LEDs 31 are arranged (i.e. the infrared-LED-arrangement area 27 and the visible-LED-arrangement area 28), each of which is elongated generally along the length direction of the substrate 26, to overlap or coexist along the length direction of the substrate 26 without a need to increase the width or length of the substrate 26 in an undue fashion. More particularly, with the above configuration, the infrared-LED-arrangement area 27 and the visible-LED-arrangement area 28 do not adversely affect one another the way the visible LEDs 31 and the infrared LEDs 30 are each suitably spaced at intervals in the arrangement areas 27 and 28 of the substrate 26. When lighted, the infrared LEDs 30 located on the front surface of the substrate 26 emit infrared light RL toward the driver via the radiating opening 22a of the case (or holding member) 22. Further, although the visible LEDs 31 are located on the back surface (or lower surface 26d) of the substrate 26, visible light VL emitted by the visible LEDs 31 will be delivered toward the driver since the light guiding element 35 which extends from the back surface (or the lower surface 26d) side to the front surface (or the upper surface 26c) side of the substrate 26 via the gap S between one of the side walls (i.e. outer side wall 25) of the case 22 and the substrate 26 deflects the visible light VL toward the radiating opening 22a. In the steering wheel 1 in accordance with the first exemplary embodiment, moreover, since the light guiding element 35 extending from the back surface (or the lower surface 26d) side to the front surface (or the upper surface 26c) side of the substrate 26 provides a long optical path, the visible light VL emitted from the visible LEDs 31 is diffused inside the light guiding element 35 sufficiently in the long optical path from the lower end 35b of the light guiding element 35, which is disposed on the back surface (or lower surface 26d) side of the substrate 26, to the upper end 35a of the light guiding element 35, which is disposed above (above the upper surface 26c) the substrate 26, thus is able to shine an entirety of a region where the light guiding element 35 is disposed in a vicinity of the radiating opening 22a (more specifically, an entirety of a region of the cover 45 above the light guiding element 35) in an even and steady fashion.

Even more specifically, in the steering wheel 1 in accordance with the first exemplary embodiment, the disposition of the visible LEDs 31 on the back side (or lower surface 26d) of the substrate 26 helps secure a long optical path length of the visible light VL emitted from the visible LEDs 31 inside the light guiding element 35 (i.e. a substantial distance from the entrance plane 37 to the exit plane 38). In comparison with an instance where the visible LEDs are located on the front or upper surface of the substrate, the configuration of this embodiment enables the visible light emitted from the visible LEDs 31 to diffuse sufficiently inside the light guiding element 35 and exit from a generally entirety of the exit plane 38 generally uniformly. Also when more than one visible LEDs 31 of different colors are employed to produce a light of desired color by color mixture, the visible light is diffused sufficiently inside the light guiding element 35 and is able to shine an entirety of the region where the light guiding element 35 is disposed in a vicinity of the radiating opening 22a (more specifically, an entirety of a region of the cover 45 above the light guiding element 35) in an even color with little color unevenness steadily.

Therefore, according to the first exemplary embodiment, the light bar 20 is formed compact in size in both width direction and length direction despite parallel use of the visible LEDs 31 and infrared LEDs 30 and is smoothly mounted on the steering wheel 1.

In the steering wheel 1 in accordance with the first exemplary embodiment, especially, the infrared LEDs 30 and the visible LEDs 31 are disposed distant from each other in the in-out direction (in other words, in the front and rear direction or in the width direction of the substrate 26). This configuration will prevent a heat caused by lighting of either one of them from affecting the other.

Figure 12:
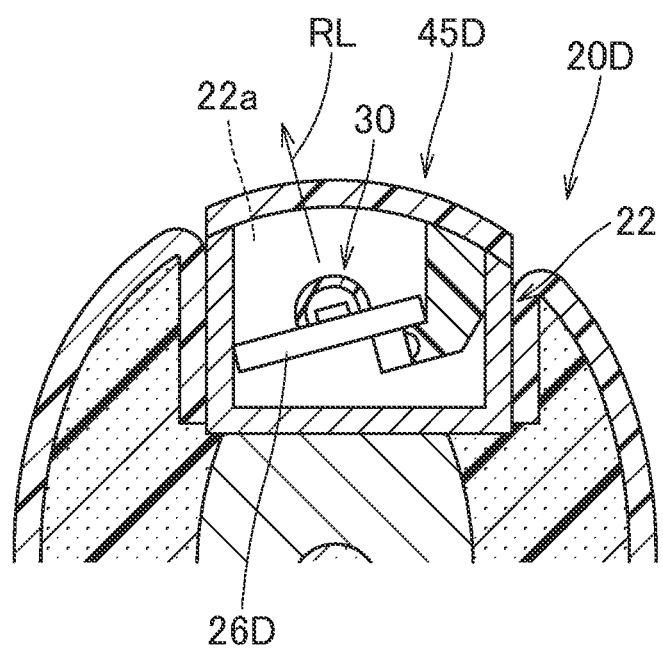
FIG. 12 is a partial enlarged cross-sectional view of yet another modification of the light bar.

In the steering wheel 1 in accordance with the first exemplary embodiment, the lens 46 is disposed over the infrared LEDs 30 above the front surface (i.e. the upper surface 26c) of the substrate 26 in order to deflect the infrared light toward the driver, as can be seen in FIG. 3. The lens 46 is able to increase a degree of freedom of arrangement of the infrared LEDs 30. By way of example, even if the infrared LEDs 30 are arranged on the substrate 26 which is disposed generally in parallel to the bottom wall 23 of the case 22 as in this embodiment, the lens 46 will guide the infrared light RL emitted from the infrared LEDs 30 so that the infrared light RL is surely emitted toward the driver from the radiating opening 22a. In comparison, if the substrate is disposed at a slant with respect to the in-out direction (or the front and rear direction) as in a light bar 20D depicted in FIG. 12 so that infrared light RL emitted from the infrared LEDs 30 is radiated rearwardly and upwardly (or inwardly and upwardly) toward the driver, a lens for deflecting the infrared light toward the driver is not necessary. The radiating opening 22a of the case 22 has only to be covered by a cover 45D.

In the steering wheel 1 in accordance with the first exemplary embodiment, the diffusing layer 41 configured to diffuse visible light is disposed on the exit plane 38 of the light guiding element 35 which is disposed towards the radiating opening 22a and configured to allow the visible light to exit. The diffusing layer 41 enables the visible light having entered into the light guiding element 35 to exit from the exit plane 38 in a further diffused state. The diffusing layer may alternatively be disposed on the entrance plane of the light guiding element 35 instead of on the exit plane, or both on the exit plane and entrance plane of the light guiding element 35. Further alternatively, a diffusing material may be mixed into the light guiding element instead of providing a diffusing layer.

Figure 13:
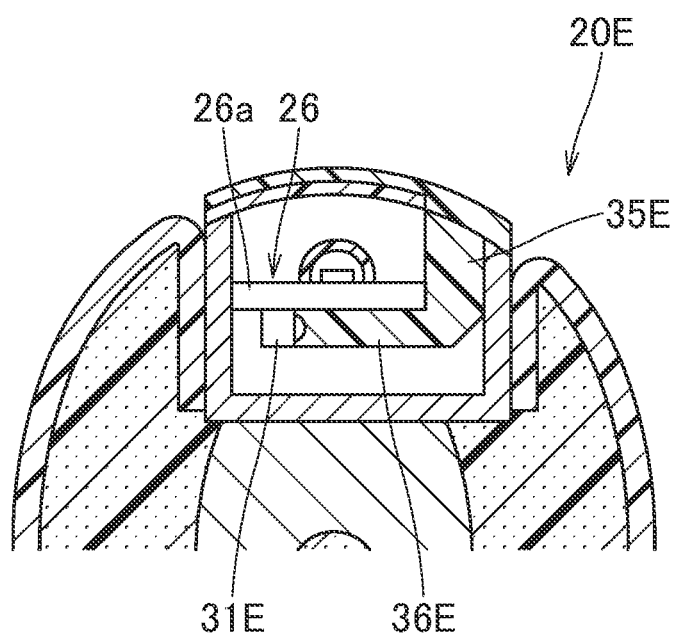
FIG. 13 is a partial enlarged cross-sectional view of yet another modification of the light bar.

In the steering wheel 1 in accordance with the first exemplary embodiment, the entrance plane 37 of the visible light is disposed in the root (or lower end 35b) portion of the light guiding element 35 which protrudes toward the visible LEDs 31 from the remaining portion, thus the light guiding element 35 has a generally L cross-sectional shape. This configuration helps secure a longer distance from the entrance plane 37 to the exit plane 38 of the light guiding element 35 (i.e. longer optical path), thus diffuse the visible light entering from the entrance plane 37 further. If such an advantageous effect does not have to be considered, the light guiding element may be formed without a protruding portion at the root end portion having the entrance plane. That is, the light guiding element may be formed into a plate having a generally uniform thickness from a lower end having the entrance plane to an upper end having the exit plane. Although the visible LEDs 31 are disposed in a vicinity of the outer end 26b of the substrate 26 in the steering wheel 1 of the first exemplary embodiment, it is also conceivable to locate the visible LEDs 31E in a vicinity of the inner end 26a of the substrate 26 (in other words, the second end of the substrate 26 remote from the gap S), while extending the protruding portion 36E of the light guiding element 35E in the front and rear direction toward the visible LEDs 31E so that the end of the protruding portion 36E would approximate to the visible LEDs 31E, as in a light bar 20E depicted in FIG. 13. This configuration will further elongate the distance from the entrance plane to the exit plane of the light guiding element (i.e. long optical path).

In the first exemplary embodiment, the light bar 20 has a curved shape elongated along the circumferential direction of the rim portion (i.e. grip) 2 of the steering wheel 1 and is mounted on the rim portion 2. Particularly, the light bar 20 of the first exemplary embodiment is mounted on a front region (i.e. on the front portion 20a) of the rim portion 2 as steered straight ahead. Therefore, the driver gripping the grip (or rim portion) 2 is able to see the light bar 20 easily while driving. However, the position of the light bar 20 in the steering wheel 1 should not be limited thereby. By way of example, the light bar may be disposed in a front edge region of the boss section or in a front edge region of one of or each of left and right spokes, as indicated with dashed-and-double-dotted lines in FIG. 1.

In the steering wheel 1 in accordance with the first exemplary embodiment, the case 22 is in contact with the rim core region 12 of the core 11 of the steering wheel 1, and the heat-transfer element 50 is disposed on the lower surface 26b side of the substrate 26 to contact with the bottom wall 23 of the case 22 so that a heat generating in the substrate 26 as actuated is transferred to the rim core region 12 of the core 11 via the case 22. Thus, the heat at lighting is dissipated from the core 11 of the steering wheel 1. Although the case 22 of this specific embodiment is brought into direct contact with the core 11 by the bottom wall 23, the bottom wall 23 of the case 22 may be configured to contact with the rim core region 12 of the core 11 indirectly via a separate heat-transfer element. It is also conceivable to bring the substrate into contact with the core via a heat-transfer element, not via the bottom wall of the case, so that the heat is transferred to the core. If such advantageous effects do not have to be considered, the case does not necessarily have to be brought into contact with the rim core region of the core. Moreover, a heat-transfer element is not necessary.

Figure 9:
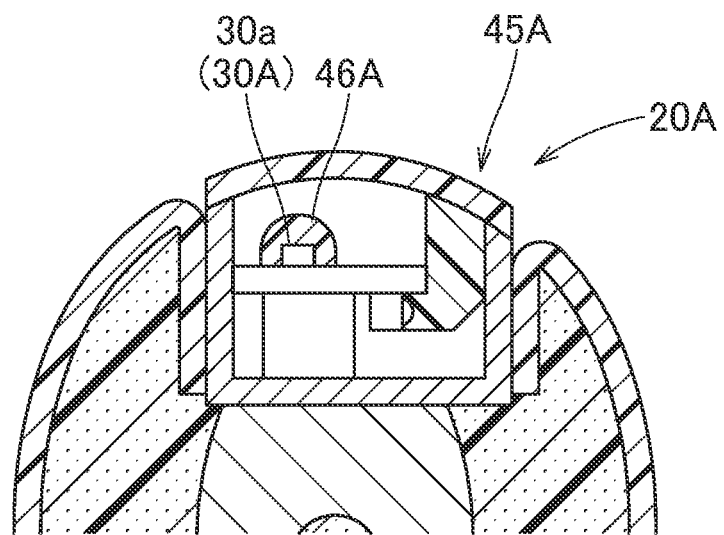
FIG. 9 is a partial enlarged cross-sectional view of a modification of the light bar.
Figure 10:
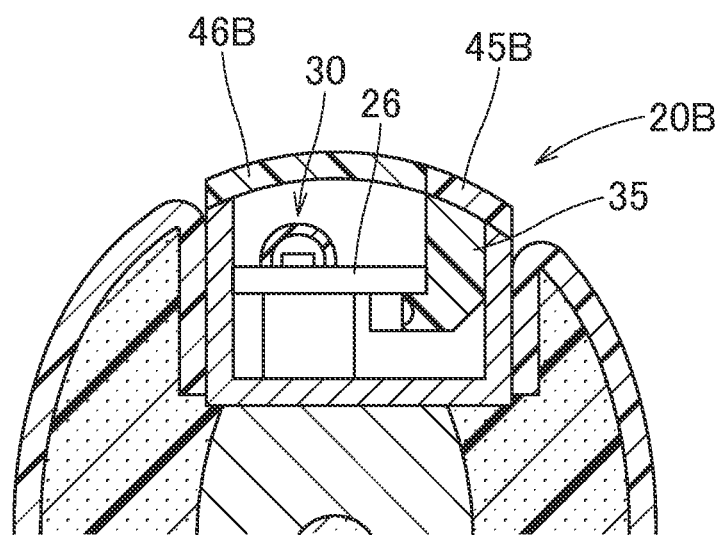
FIG. 10 is a partial enlarged cross-sectional view of another modification of the light bar.
Figure 11:
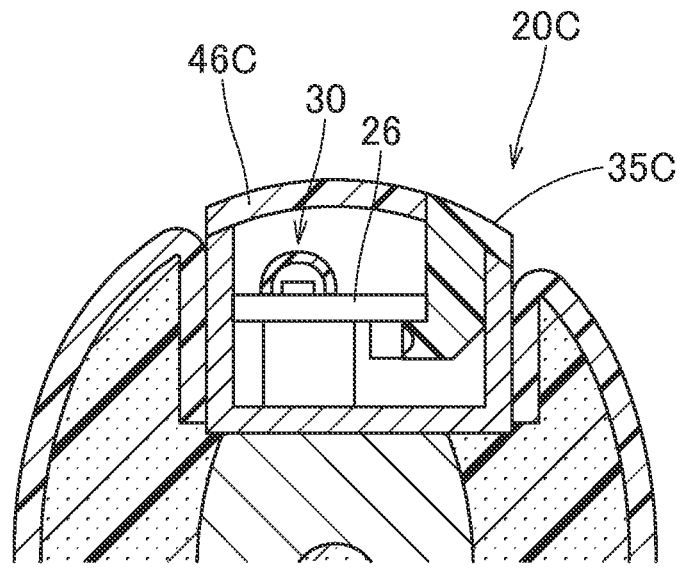
FIG. 11 is a partial enlarged cross-sectional view of yet another modification of the light bar.

In the steering wheel 1 in accordance with the first exemplary embodiment, the lens 46 that is disposed over the infrared LEDs 30 above the front surface (upper surface 26c) of the substrate 26 is integrally formed with the cover 45. However, the configurations of the cover and lens should not be limited thereby. By way of example, a plurality of lens 46A may be provided separate from a cover 45A to each directly cover an infrared LED 30A which is composed only of a light emitting portion 30a, as in a light bar 20A depicted in FIG. 9. Even when the cover and lens are integrally formed, the cover does not necessarily have to cover the lens. By way of example, like a light bar 20B depicted in FIG. 10, a lens 46B may be configured to be disposed only over the substrate 26 while a cover 45B is disposed only over the light guiding element 35. Further alternatively, when a light guiding element is arranged over an entire length of the case, the light bar may be formed without a cover, as in a light bar 20C depicted in FIG. 11. In the light bar 20C, a lens 46C is disposed over the substrate 26, and a light guiding element 35C is so arranged as to be exposed in the upper surface of the light bar 20C.

In the steering wheel 1 in accordance with the first exemplary embodiment, furthermore, the light guiding element 35 used to guide visible light VL has one-fifth width of that of the light bar 20 in the front and rear direction (i.e. in the in-out direction). The light bar 20 is configured to warn or communicate with the driver by illuminating the narrow area in the upper surface of the light guiding element 35 in a predetermined color(s) or with a predetermined pattern, without displaying characters or symbols. However, the configuration of the light bar should not be limited thereby. By way of example, the light bar may be configured to display textual or symbolic information by increasing the width of the light guiding element and inserting a separate display layer between the light guiding element and the cover. Further, in the foregoing embodiment, the region where the light guiding element 35 (i.e. the visible-LED-arrangement area 28) is approximately half of the infrared-LED-arrangement area 27 (or the substrate 26) in the length direction. However, the length of the visible-LED-arrangement area should not be limited thereby. By way of example, the visible-LED-arrangement area may be arranged over a generally entire area in the length direction of the infrared-LED-arrangement area.

A steering wheel 60 in accordance with a second exemplary embodiment is now described. The steering wheel 60 in accordance with the second exemplary embodiment has the same configuration as that of the steering wheel 1 in accordance with the first exemplary embodiment except in a light bar 65. Therefore, common members will be given a symbol "A" at the end of respective reference numerals, and will not be described in detail.

Figure 14:
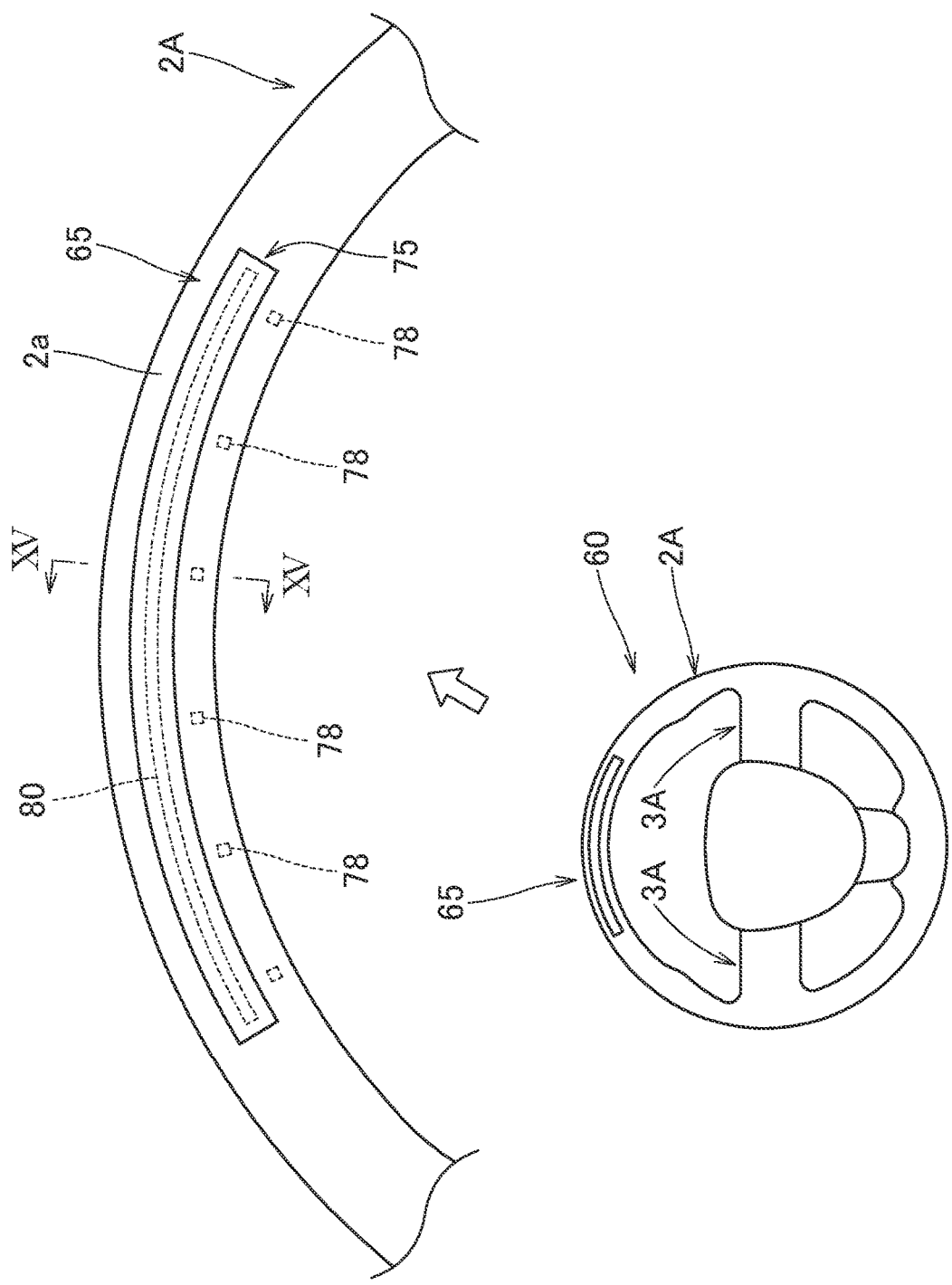
FIG. 14 is a partial enlarged plan view of a steering wheel in accordance with a second exemplary embodiment, showing a portion where a light bar is mounted.
Figure 22:
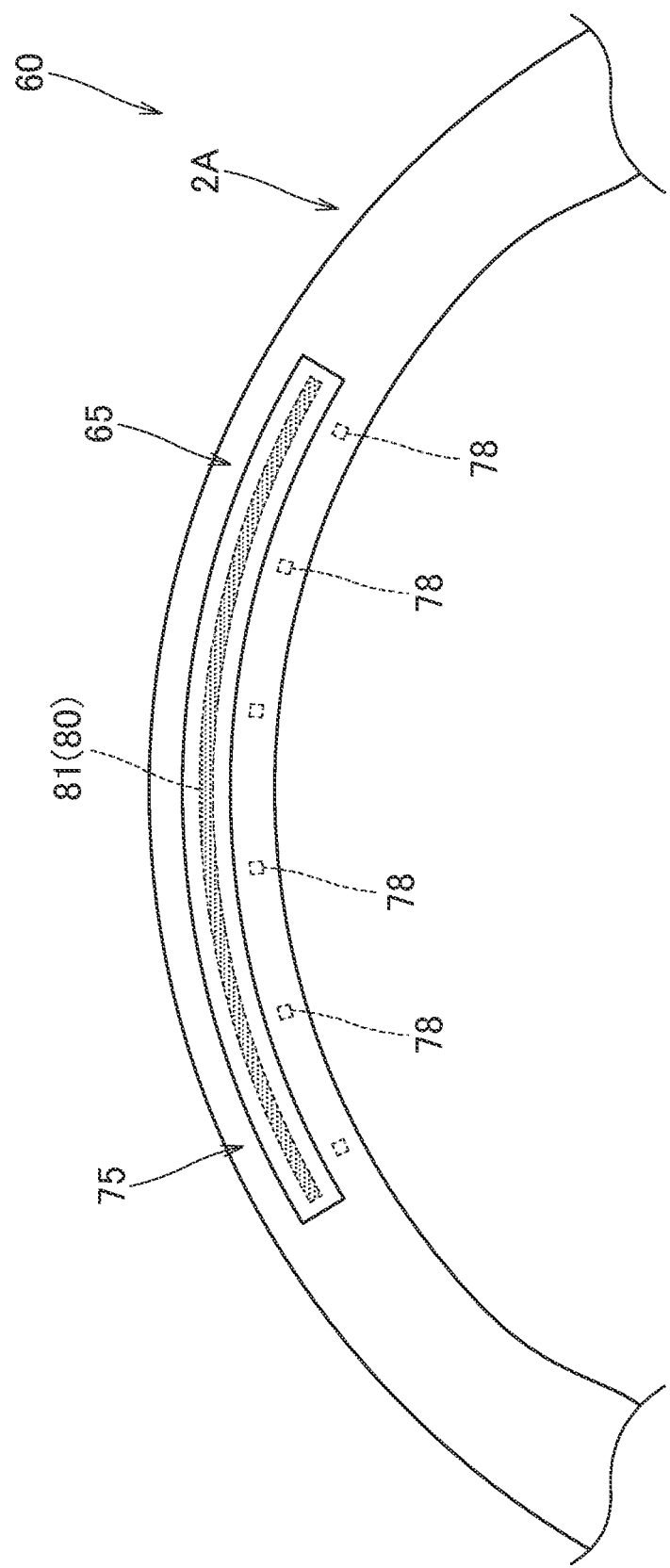
FIG. 22 is a schematic partial enlarged plan view of the steering wheel of FIG. 14 showing the light bar at lighting of visible LEDs.

In the steering wheel 60 in accordance with the second exemplary embodiment, the light bar 65 is disposed on an upper side of a front portion 2a of a circular ring-shaped rim portion (as a grip) 2A between left and right spokes 3A as can be seen in FIGS. 14 and 22, similarly to the steering wheel 1 in accordance with the first exemplary embodiment. More specifically, the light bar 65 is formed into a generally curved band shape elongated generally along a circumferential direction of the rim portion 2A, as viewed from above. The light bar 65 is continuously arranged in an approximately one sixth area of the rim portion 2A such that the center in the length direction coincides with a front end of the rim portion 2A, similarly to the light bar 20 in the steering wheel 1 of the first exemplary embodiment.

Figure 15:
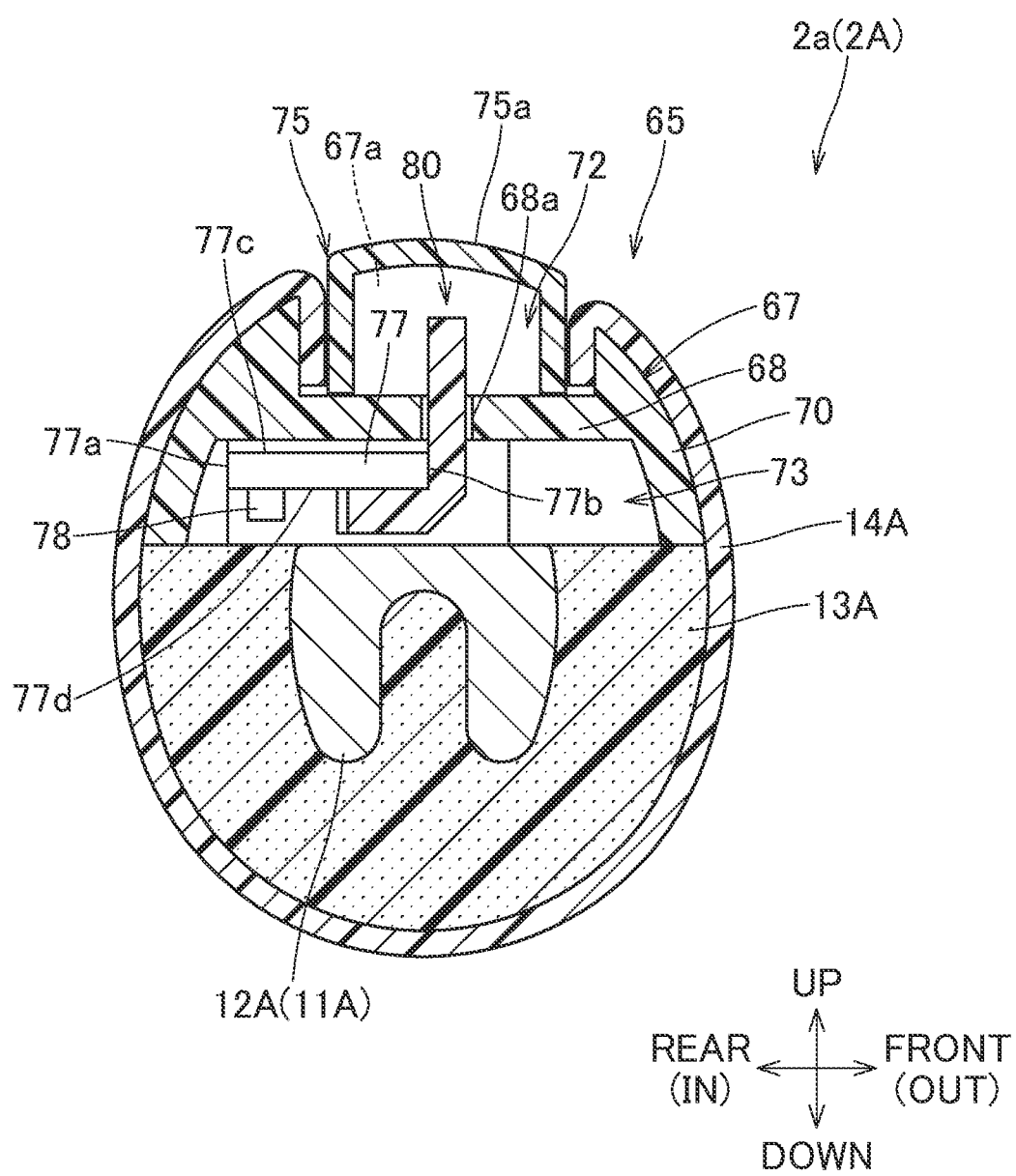
FIG. 15 is a cross-sectional view of the steering wheel taken along line XV-XV of FIG. 14.
Figure 20:
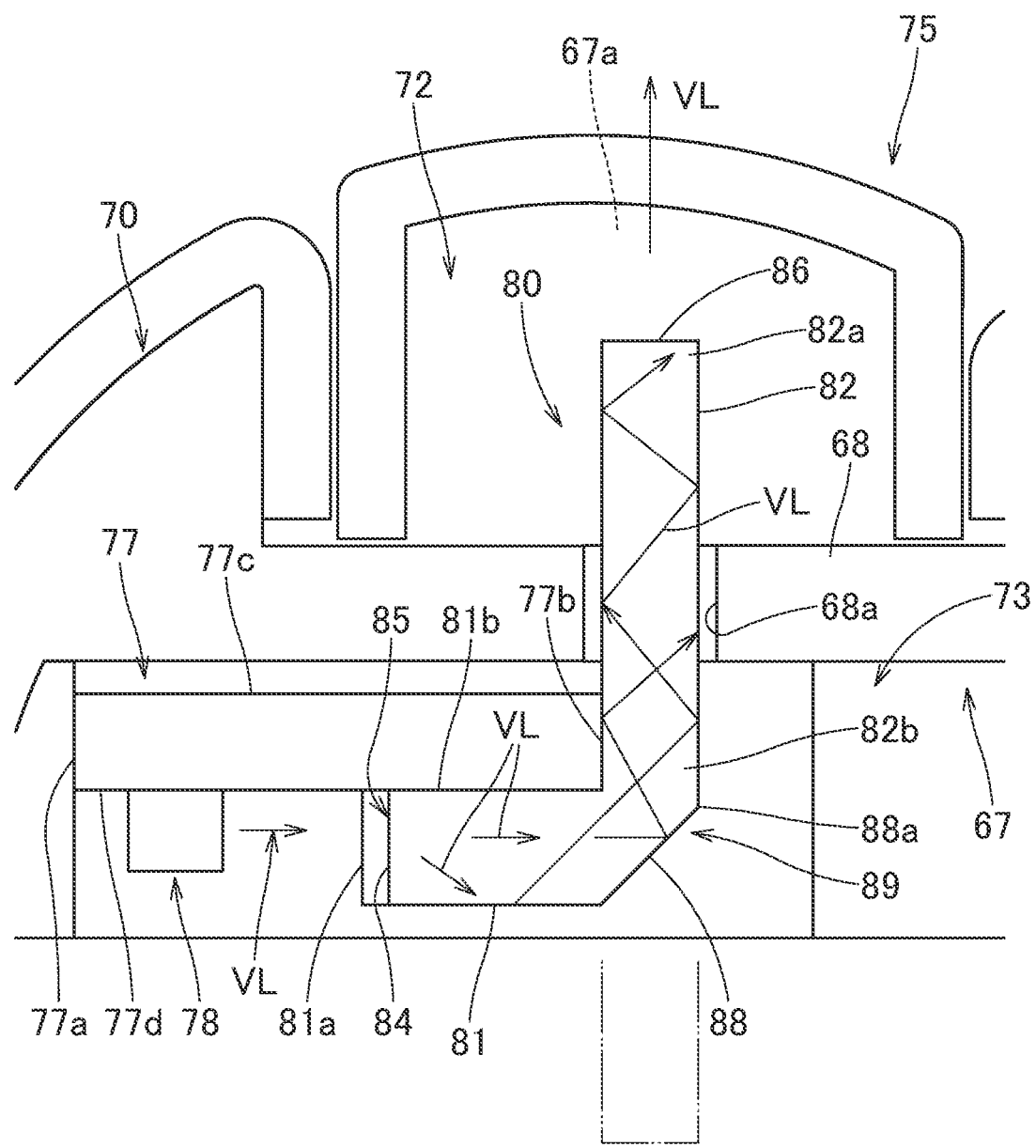
FIG. 20 is a schematic partial enlarged sectional view of the steering wheel of FIG. 14 illustrating a diffusion behavior of visible light.

As can be seen in FIGS. 15 and 20, the light bar 65 includes a holding member 67, a substrate 77 which is held by the holding member 67, a plurality of visible light sources (or visible LEDs 78) which are arranged generally along a length direction of the substrate 77, a light guiding element 80, and a cover 75 which lids a later-described radiating opening 67a of the holding member 67.

The holding member 67 is fabricated from synthetic resin (polycarbonate resin, in this embodiment). The holding member 67 of this embodiment constitutes an upper portion of the rim portion 2A (more particularly, an upper portion of the core 11A). Referring to FIG. 15, the holding member 67 includes a mounting wall 68 on which the substrate 77 is mounted, and a circumferential wall 70 which extends upwardly and downwardly from the mounting wall 68. The circumferential wall 70 has a curved outer surface so as to be continuous with an outer surface of the cladding layer 13A, and includes an opening at the upper end. This opening serves as a radiating opening 67a for radiating visible light VL at lighting of the visible LEDs 78. The mounting wall 68 is formed generally along a front and rear direction, or generally in parallel to a rim plane of the rim portion 2A, generally at the center in an up and down direction of the circumferential wall 70. The substrate 77 is mounted on a back surface or an underside of the mounting wall 68. At a vicinity of the center in a width direction of the mounting wall 68, there is formed a single, elongated insert hole 68*a* for receiving a later-described opening-side portion 82 of the light guiding element 80. In the holding member 67 of this embodiment, a region above the mounting wall 68 constitutes an opening-side section 72 for radiating the visible light VL, and a region below the mounting wall 68 constitutes a storing section 63 for storing and holding the substrate 77 and visible LEDs 78. The radiating opening 67*a* in the opening-side section 72 is lidded by the cover 75 having a generally inverse U cross-sectional shape. In this specific embodiment, opposite terminals of the outer skin layer 14A are disposed between gaps formed between the cover 75 and the circumferential wall 70.

The cover 75 has a generally inverse U cross-sectional shape opening downward, and is configured to lid a generally entire area of the radiating opening 67*a* of the holding member 67. An upper wall portion 75*a* of the cover 75 lidding the radiating opening 67*a* has such a curved cross-sectional shape that continues smoothly to an outer circumferential plane of the outer skin layer 14A in the rim portion 2A, as can be seen in FIG. 15. The cover 75 is transparent to visible light VL emitted from the visible LEDs 78. In a similar fashion to the cover 45 of the steering wheel 1 in accordance with the first exemplary embodiment, the cover 75 is fabricated from black transparent synthetic resin having translucency such as polycarbonate resin and acrylic resin.

The substrate 77 is mounted on the lower surface (i.e. back surface) of the mounting wall 68 of the holding member 67 generally in parallel to the mounting wall 68, in other words, generally in parallel to an opening plane of the radiating opening 67*a*, generally along the front and rear direction. In this embodiment, the substrate 77 is disposed in a rear half (or inner half) region of the lower surface of the mounting wall 68. Although not depicted in detail, the substrate 77 is arranged over a generally entire area in the length direction of the light bar 65 (or cover 75). The substrate 77 of this embodiment is held by the holding member 67 by being mounted on the holding member 67 at predetermined positions in such a manner that a slight gap is formed between itself and the mounting wall 68.

Figure 17:
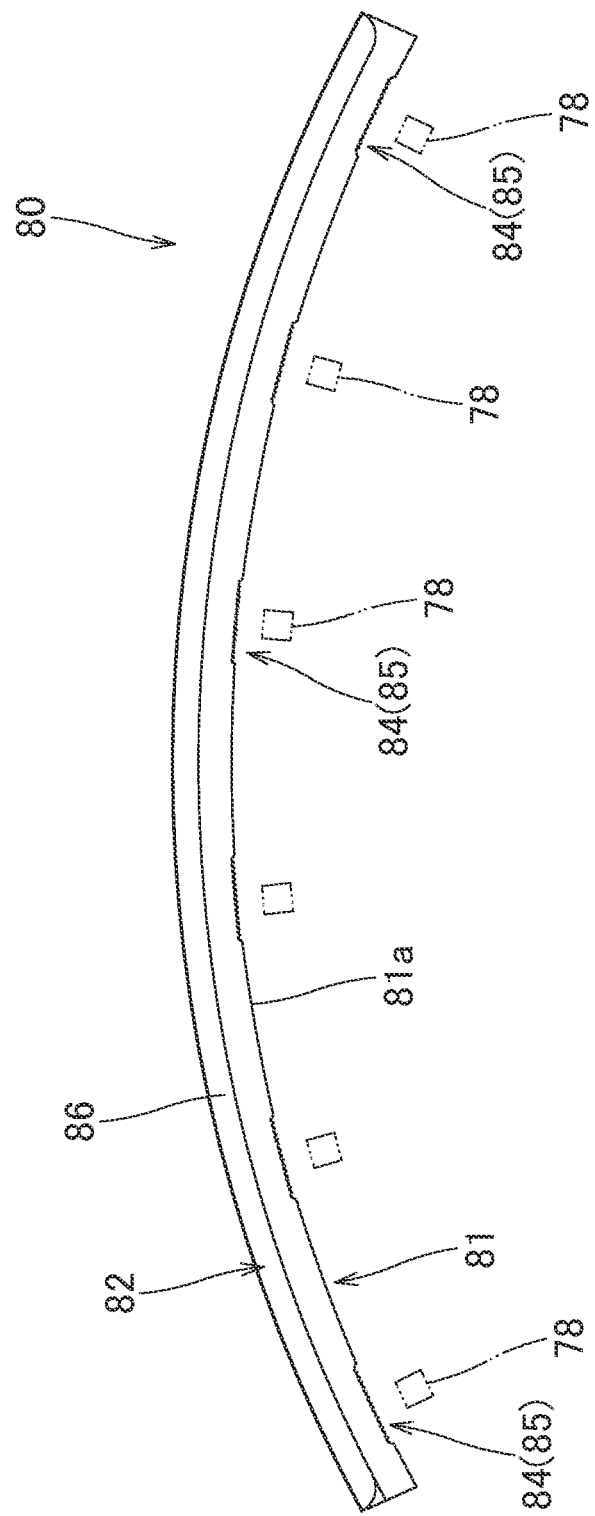
FIG. 17 is a plan view of the light guiding element of FIG. 16.

Same visible LEDs as those used in the steering wheel 1 in accordance with the first exemplary embodiment are used as the visible LEDs 78 as the visible light sources. The visible LEDs 78 are located on a back surface (i.e. lower surface 77*d*) of the substrate 77, and arranged generally along the length direction of the substrate 77. In this embodiment, six visible LEDs 78 are spaced at intervals in an entire area in the length direction of the substrate 77 (or light guiding element 80), as can be seen in FIGS. 14, 17 and 22. More specifically, the visible LEDs 78 are disposed at positions in proximity to an inner end (or rear end) 77*a* of the lower surface 77*d* of the substrate 77 so as to emit visible light VL forward or outwardly, i.e. toward the light guiding element 80, as can be seen in FIGS. 15 and 20. The visible LEDs 78 may be configured to be lighted with a predetermined lighting/blinking pattern under control of a not-shown actuating circuit, similarly to the visible LEDs 31 used in the steering wheel 1 in accordance with the first embodiment.

The light guiding element 80 is disposed over a generally entire area in the length direction of the light bar 75. As can be seen in FIGS. 14, 16, 17 and 22, the light guiding element 80 is formed into a generally arcuate, curved shape generally shaped to the curvature of the rim portion 2A as viewed from the up and down direction. The light guiding element 80 extends from the back side (or lower surface 77*d* side) to the front side (or upper surface 77*c* side) of the substrate 77 via an outer side (or front side) of an outer end 77*b* of the substrate 77, as can be seen in FIGS. 15 and 20. More specifically, the light guiding element 80 includes a light-source-side portion 81 which is disposed towards the visible LEDs 78 in the back side (or lower surface 77*d* side) of the substrate 77, and an opening-side portion 82 which intersects with the light-source-side portion 81 and extends from the back side (or lower surface 77*d* side) to the front side (or upper surface 77*c* side) of the substrate 77, thus has a generally L cross-sectional shape. In this embodiment, the opening-side portion 82 is inserted through the insert hole 68*a* formed in the mounting wall 68 of the holding member 67 such that the upper end 82*a* is disposed toward the cover 75. That is, inserted through the insert hole 68*a*, the opening-side portion 82 of the light guiding element 80 is disposed at a vicinity of the center in the width direction of the mounting wall 68, in other words, at a vicinity of the center in a width direction of the light bar 65. The light-source-side portion 81 and the opening-side portion 82 are generally orthogonal to each other. The light guiding element 80 is configured such that the light-source-side portion 81 and the opening-side portion 82 have a generally same thickness. The thickness is greater than a width in the up and down direction of each of the visible LEDs 78, so that the light-source-side portion 81 covers an entire front side (or outer side) of each of the visible LEDs 78 in the up and down direction, as can be seen in FIGS. 15 and 20. Similarly to the light guiding element 35 in the steering wheel 1 of the first exemplary embodiment, the light guiding element 80 is fabricated from synthetic resin such as polycarbonate resin and acrylic resin.

Figure 16:
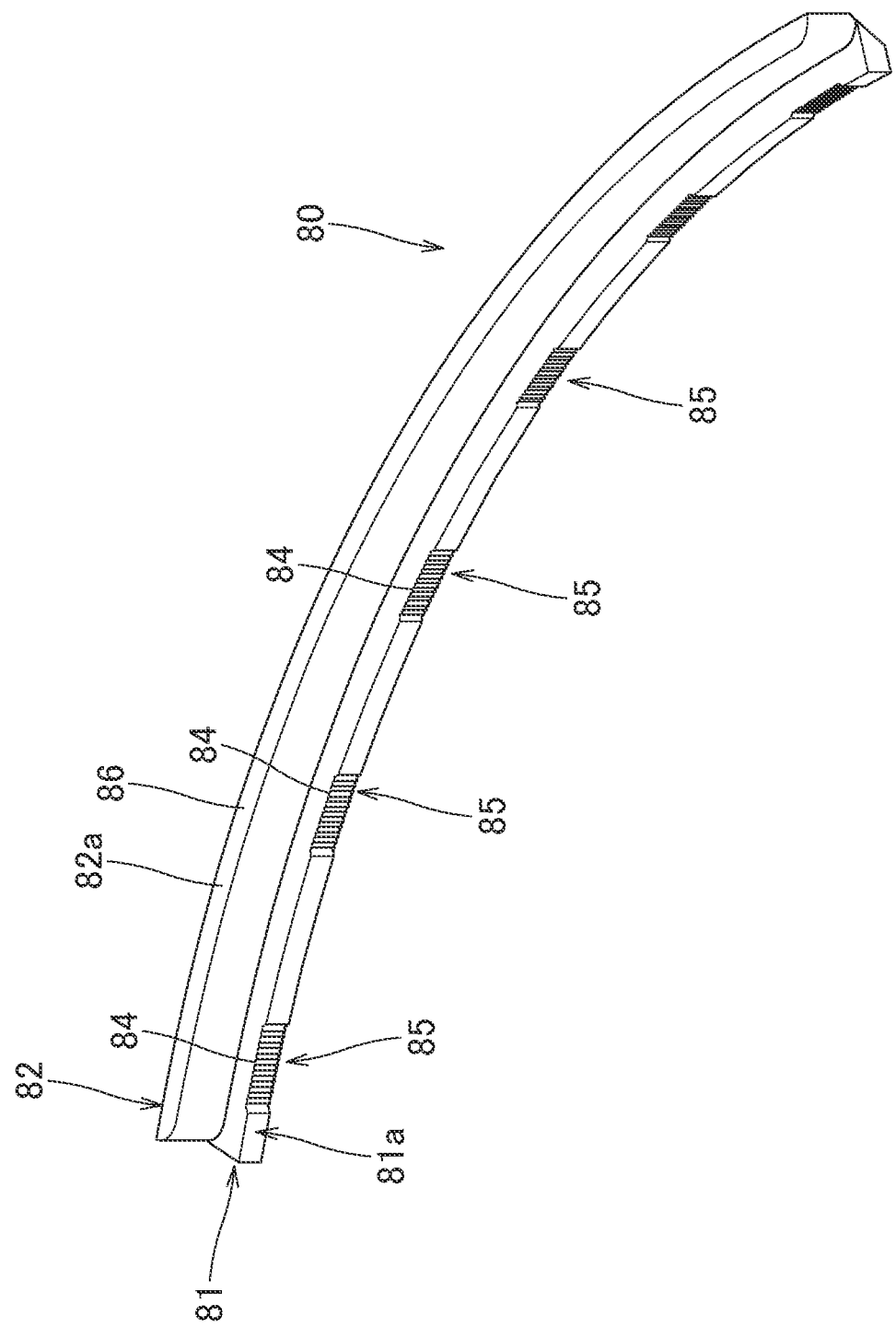
FIG. 16 is a schematic perspective view of a light guiding element for use in the light bar in the steering wheel of FIG. 14.
Figure 19:
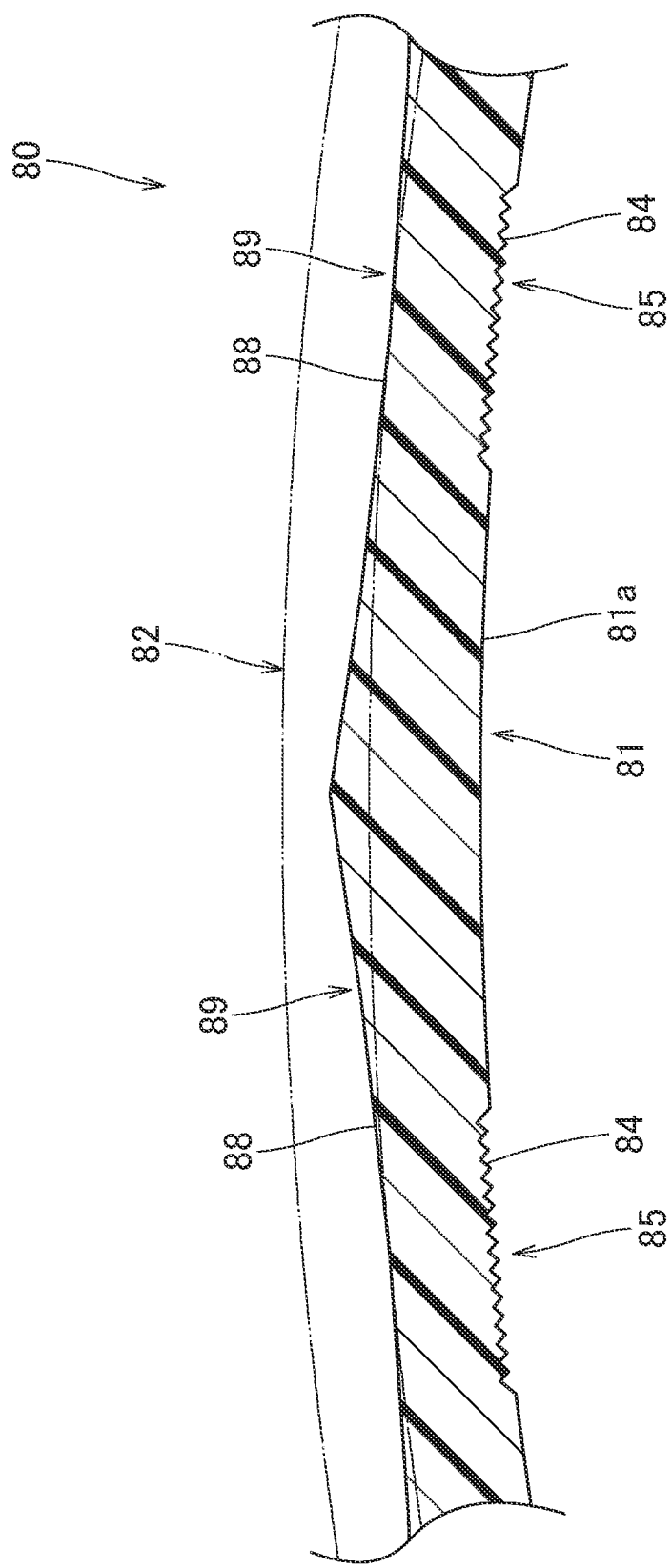
FIG. 19 is an enlarged horizontal sectional view taken generally along a front and rear direction at an entrance plane (entrance-plane-forming portion) of the light guiding element of FIG. 16.

The light guiding element 80 includes a plurality of entrance planes 84 for receiving visible light VL emitted from the visible LEDs 78 on a leading end surface of the light-source-side portion 81 (on an end surface of the light-source-side portion 81 facing the visible LEDs 78, i.e. in a rear-end 81*a* surface of the light-source-side portion 81, in this specific embodiment), and includes an exit plane 86 for radiating the incoming visible light VL upward (i.e. toward the radiating opening 67*a*) on an upper end 82*a* surface of the opening-side portion 82, as can be seen in FIG. 20. Each of the entrance planes 84 in this embodiment has a prismatic structure. More specifically, as can be seen in FIGS. 16 and 19, each of the entrance planes 84 is composed of an entrance-plane-forming portion 85 which includes numerous serrate projections extending generally along the up and down direction continuously. Each of the entrance planes 84 (i.e. the entrance-plane-forming portions 85) is formed over an entire area in an up and down direction of the rear end 81 surface of the light-source-side portion 81 of the light guiding element 80. In this embodiment, six entrance-plane-forming portions 85 (i.e. entrance planes 84) are spaced at intervals along the length direction of the light guiding element 80 to correspond to locations of the visible LEDs 78. A width in a direction extending along the rim plane of each of the entrance-plane-forming portions 85 (i.e. entrance planes 84) is greater than that of each of the visible LEDs 78, and is approximately three times greater than a width in the up and down direction (i.e. thickness) of the light-source-side portion 81 (FIGS. 16 and 17).

Figure 18:
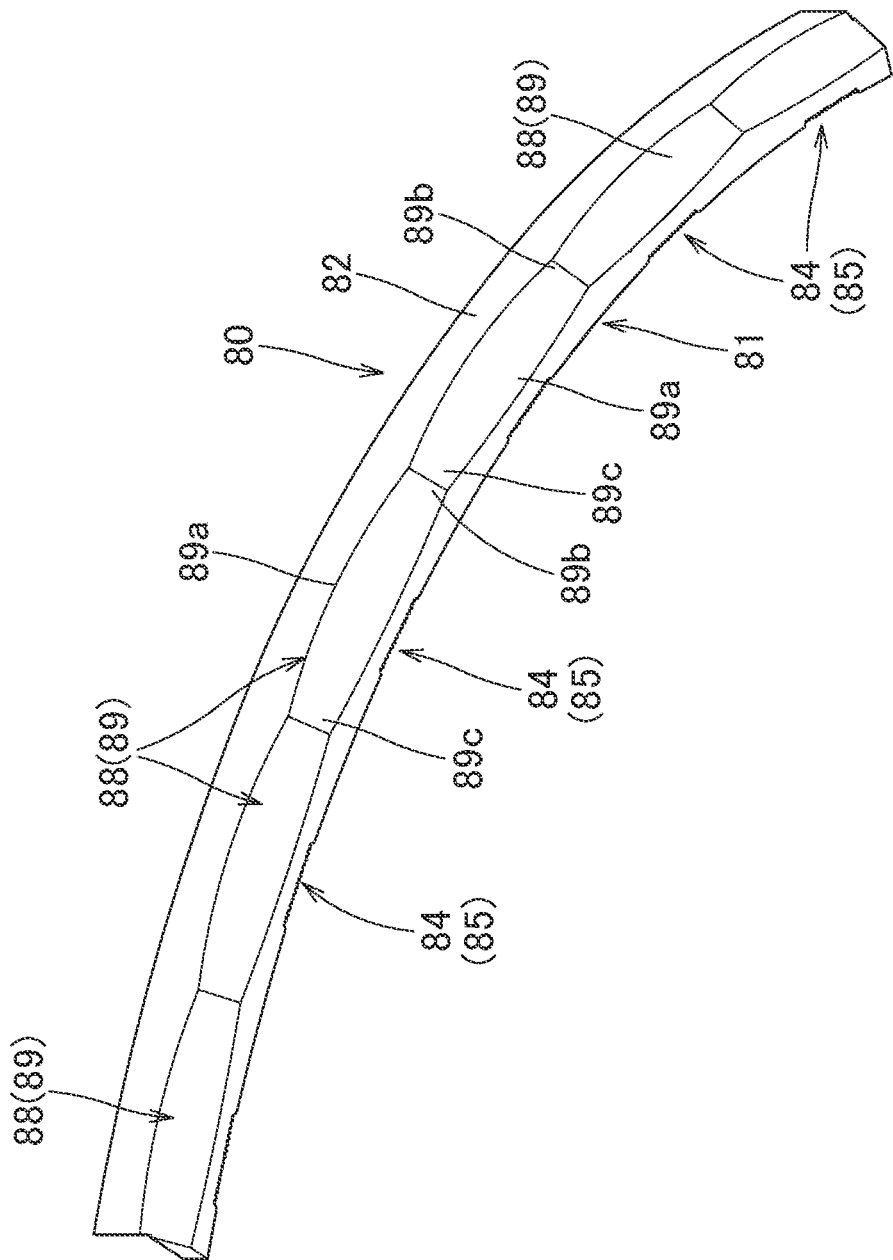
FIG. 18 is a schematic perspective view of the light guiding element of FIG. 16 as viewed from outside and below.
Figure 21:
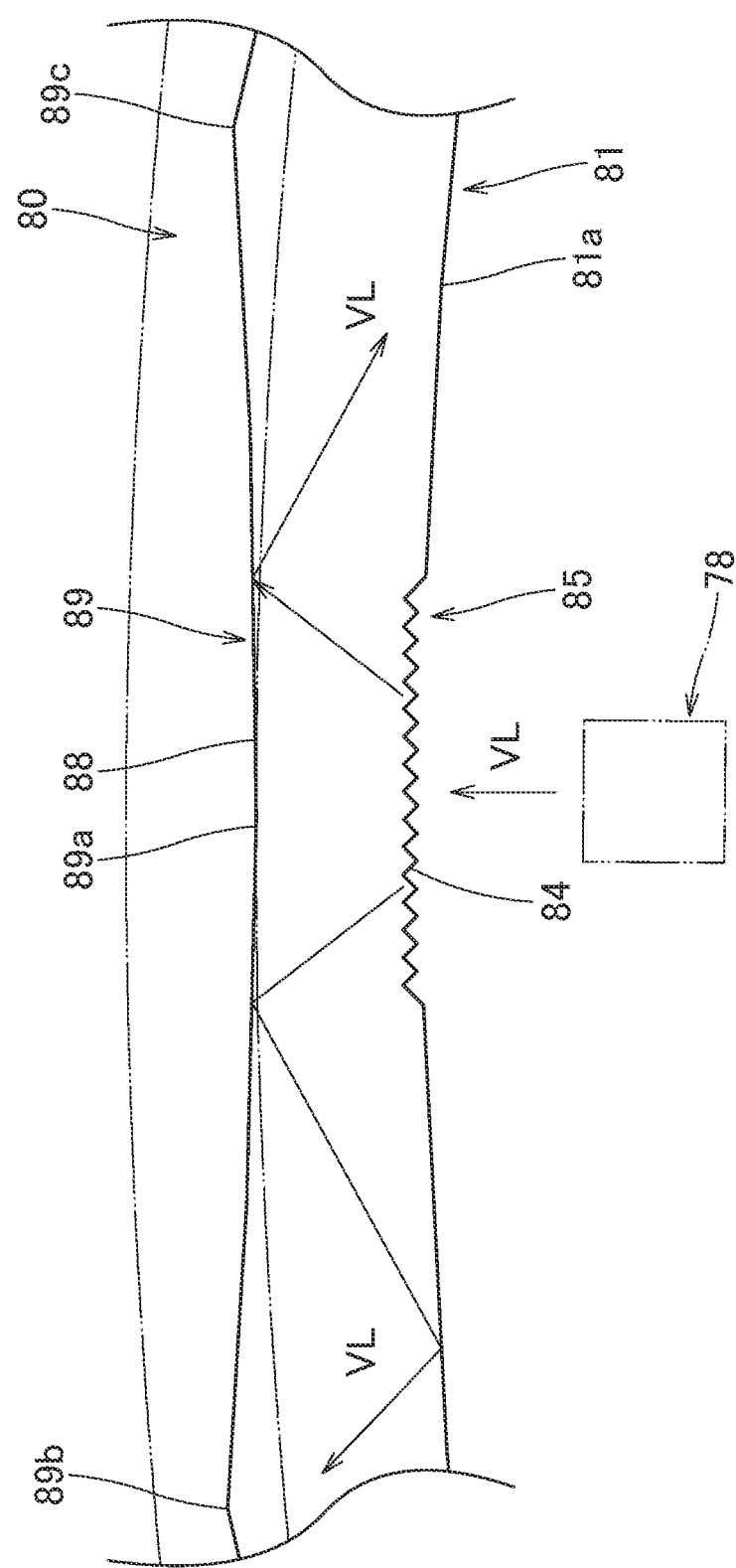
FIG. 21 is an enlarged horizontal sectional view of the light guiding element taken generally along the front and rear direction, showing an entrance plane (an entrance-plane-forming portion) and a deflecting plane (a deflecting-plane-forming portion) and illustrating a diffusion behavior of the visible light.

Referring to FIG. 20, the light guiding element 80 further includes, at a position in a vicinity of an intersection of the light-source-side portion 81 and the opening-side portion 82 (in other words, in a vicinity of a lower end 82*b* of the opening-side portion 82) and opposed to the entrance plane 84, a plurality of deflecting planes 88 each of which is configured to deflect visible light VL having entered from a corresponding entrance plane 84 upward, i.e. towards the exit plane 86 disposed towards the radiating opening 67a. More specifically, each of the deflecting planes 88 is composed of a deflecting-plane-forming portion 89 which is formed by cutting an outer lower end (front lower end) region of the opening-side portion 82 at a position opposed to and corresponding to the entrance plane 84 (i.e. visible LED 78). As can be seen in FIG. 18, six deflecting-plane-forming portions 89 are formed to correspond to the visible LEDs 78 and entrance-plane-forming portions 85. Each of the deflecting-plane-forming portions 89 includes a great-width portion 89a at a central position opposed to the entrance-plane-forming portion 85 in the front and rear direction, and is narrowed towards opposite ends 89b, 89c in width. More specifically, a width in a direction extending along the length direction (left and right direction) of the light guiding element 80 of each of the deflecting-plane-forming portions 89 (or deflecting planes 88) is approximately three times greater than the width in the left and right direction of each of the entrance planes 84 (or entrance-plane-forming portions 85). Further, as can be seen in FIGS. 19 and 21, each of the deflecting-plane-forming portions 89 (or deflecting planes 88) is configured such that the central portion (i.e. the great-width portion 89a) opposed to the entrance-plane-forming portions 85 is disposed rearward (i.e. inward) and the opposite ends 89b, 89c are disposed farther forward (i.e. outward), in a horizontal sectional plane taken along the front and rear direction, in other words, such that the great-width portion 89a is disposed closer to, or recessed more towards the entrance-plane-forming portions 85, than the opposite ends 89b, 89c. In this embodiment, the deflecting-plane-forming portion 89 is curved in an opposite manner to the curvature of the light guiding element 80. Further, in a vertical sectional view taken along the front and rear direction generally at the center in the left and right direction of the entrance plane 84 (or entrance-plane-forming portion 85) depicted in FIG. 20, the deflecting plane 88 (or deflecting-plane-forming portion 89) intersects both with a lower surface of the light-source-side portion 81 and a front surface of the opening-side portion 82, which are generally orthogonal, at approximately 45°, and an upper edge 88a of each of the deflecting planes 88 (or deflecting-plane-forming portions 89) generally coincides with an upper surface 81b of the light-source-side portion 81 in position in the up and down direction. In other words, each of the deflecting planes 88 (or deflecting-plane-forming portions 89) is configured to cover an entire front side (or outer side) of each of the visible LEDs 78 in the up and down direction.

In the steering wheel 60 in accordance with the second exemplary embodiment, the light-source-side portion 81 of the light guiding element 80 extends along the substrate 77, instead of extending in perpendicular to the substrate 77, in the back side of the substrate 77, as indicated with dashed-and-double-dotted lines in FIG. 20. This configuration helps secure a long optical path even in an instance where the light bar does not have an enough space for allowing the light guiding element to extend perpendicularly to the substrate in the back side of the substrate 77. In comparison with an instance where the visible light sources are disposed on the front surface of the substrate, therefore, the visible light VL emitted from the visible LEDs 78 is diffused in the long optical path from the back surface (lower surface 77d) side to the upper side (upper surface 77c) side of the substrate 77, thus is able to shine an entirety of a region where the light guiding element 80 is disposed in a vicinity of the radiating opening 67a in an even and steady fashion, as can be seen in FIG. 20.

In the steering wheel 60 in accordance with the second exemplary embodiment, the opening-side portion 82 of the light guiding element 80 is disposed in a vicinity of the center in the width direction of the light bar 65. This configuration makes a central region in the width direction of the light bar 65 shine at lighting of the visible LEDs 78, as can be seen in FIG. 22. However, the location of the light guiding element should not be limited thereby. The light guiding element 35 may also be disposed proximate to one end in the width direction (front end) of the light bar 20, as in the steering wheel 1 in accordance with the first exemplary embodiment.

In the steering wheel 60 in accordance with the second exemplary embodiment, moreover, the light bar 65 has a curved shape elongated along the circumferential direction of the grip (i.e. rim portion) 2A of the steering wheel 60 and is disposed in the grip 2A, and the light guiding element 80 has a curved shape extending generally along the curvature of the grip 2A. The light guiding element 80 includes a plurality of entrance planes 84 each of which is disposed in the light-source-side portion 81 so as to be opposed to one of the visible LEDs 78, each of the entrance planes 84 having a prismatic structure, the exit plane 86 disposed toward the radiating opening 67a, and a plurality of deflecting planes 88 each of which is disposed at a positon opposed to one of the entrance planes 84 in a vicinity of the intersection between the light-source-side portion 81 and the opening-side portion 82. Each of the deflecting planes 88 is configured to deflect the visible light having entered from the corresponding entrance plane 84 toward the exit plane 86.

With this configuration, the visible light VL emitted from each of the visible LEDs 78 is largely diffused by the corresponding entrance plane 84 having a prismatic structure at entering into the light guiding element 80, then deflected toward the exit plane 86 by the corresponding deflecting plane 88. That is, the visible light VL is further diffused inside the opening-side portion 82 while being deflected by the deflecting plane 88, then emitted from the exit plane 86. To describe more specifically, in the steering wheel 60 in accordance with the second exemplary embodiment, each of the entrance-plane-forming portions 85 constituting the entrance planes 84 has a prismatic structure that includes numerous serrate projections extending generally along the up and down direction continuously. Each of the deflecting planes 88 (the deflecting-plane-forming portion 89), which is opposed to the corresponding entrance plane 84, is greater in width in the direction extending in the length direction of the light guiding element 80 (i.e. in the left and right direction) than the entrance plane 84 (the entrance-plane-forming portion 85), and is so formed as to extend toward left and right from the entrance plane 84 (the entrance-plane-forming portion 85). Further, each of the deflecting planes 88 (the deflecting-plane-forming portion 89) is also formed into such a curved recessed shape that the central portion opposed to the entrance plane 84 (i.e. the entrance-plane-forming portions 85) is disposed farther toward the entrance plane 84 (i.e. inward) and has a greater width while the opposite left and right ends are disposed outward and each have a smaller width than the central portion. With this configuration, the visible light VL emitted from each of the visible LEDs 78 is largely diffused in the length direction of the light guiding element 80 (i.e. in the left and right direction) by the entrance plane 84 having a prismatic structure at entering into the light-source-side portion 81, then deflected by the deflecting plane 88 and diffused further in the length direction of the light guiding element 80, as can be seen in FIG. 21. Therefore, although the light guiding element 80 is formed into an elongated shape curved along the curvature of the grip 2A, the visible light VL will be largely diffused in the length direction of the light guiding element 80 inside the light guiding element 80 and uniformly shine an entirety of the region where the light guiding element 80 is disposed in a vicinity of the radiating opening 67a.

Figure 23:
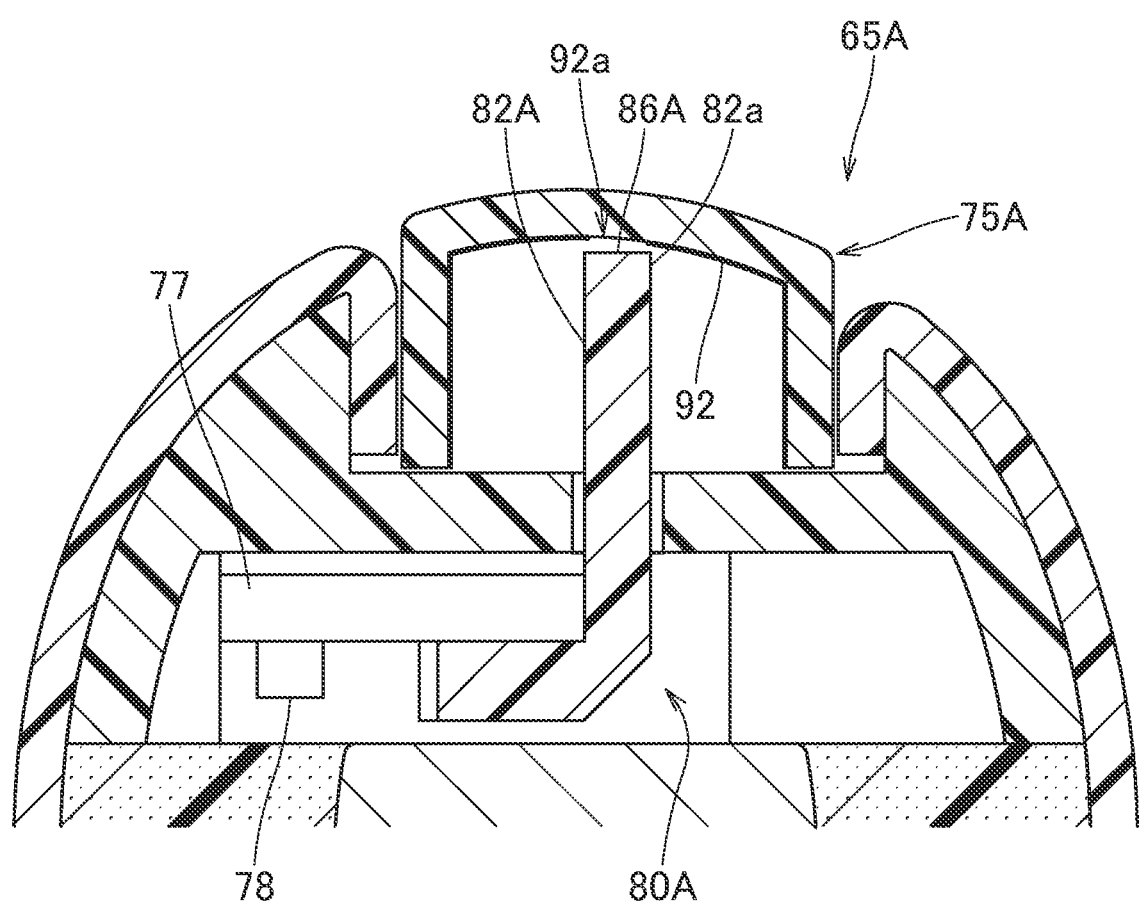
FIG. 23 is a partial enlarged cross-sectional view of a modification of the light bar.

In a further embodiment shown in FIG. 23, a light bar 65A may be configured such that an upper end 82a of an opening-side portion 82A of a light guiding element 80A is disposed in proximity to a cover 75A (in other words, such that an exit plane 86A is disposed in proximity to the cover 75A), and such that a light-blocking layer 92 is disposed in an entire back surface of the cover 75A except the region where the opening-side portion 82A is disposed. The light-blocking layer 92 is composed of a coating material opaque to visible light. More specifically, the light-blocking layer 92 is formed on the back surface of the cover 75A such that its margin overlaps with the opening-side portion 82A in an up and down direction (in other words, such that the margin slightly enters a region above the opening-side portion 82A) and an opening 92a is formed above the opening-side portion 82A. More particularly, the light-blocking layer 92 is composed of a black coating material. This configuration will prevent visible light exiting the exit plane 86A of the light guiding material 80A from leaking from an undesired region, thus improving visibility of the light guiding element 80A as lighted. This configuration may also be applied to the light bar 20 in the steering wheel 1 in accordance with the first embodiment. If a light-blocking layer is formed on a back side of a cover in a light bar provided with infrared light sources as well, as in the first exemplary embodiment, the light-blocking layer will be composed of a coating material opaque to visible light and transparent only to infrared light. The same effects can be obtained without providing a light-blocking layer. By way of example, in the light bar 20 of the steering wheel 1 in accordance with the first exemplary embodiment, the light guiding element 35 may be provided, in a vicinity of the upper end 35a, with an extended portion 35c overlapping slightly with the lens 46, as indicated with dashed-and-double-dotted lines in FIG. 3. This configuration will also prevent visible light from leaking from a small gap between the light guiding element 35 and lens 46.

Although the grip or rim portion 2, 2A of the steering wheel 1, 60 in the foregoing disclosure is formed into a circular ring shape, the invention may also be applied to a steering wheel having a grip in different shapes and types, such as a square ring shape and a yoke type protruding from the boss section.

A steering wheel according to an aspect of the present disclosure includes a light bar at a position visible to a driver. The light bar includes a holding member that includes a pair of side walls and a radiating opening formed between first end portions of the side walls; a substrate that is stored and held inside the holding member generally in parallel to an opening surface of the radiating opening in such a manner that a gap is formed between a first end in a width direction of the substrate and one of the side walls of the holding member, the substrate including a front surface facing towards the radiating opening and a back surface facing away from the radiating opening; a plurality of infrared light sources that are mounted and arranged on the front surface of the substrate generally along a length direction of the substrate for emitting infrared light toward the driver via the radiating opening when actuated; a plurality of visible light sources that are mounted and arranged on the back surface of the substrate generally along the length direction of the substrate for emitting visible light when actuated; and a light guiding element that is configured to deflect the visible light emitted from the visible light sources toward the radiating opening so that the visible light is radiated from the radiating opening, the light guiding element extending from a side of the back surface to a side of the front surface of the substrate via the gap.

In the steering wheel configured as described above, the infrared light sources are located on the front surface of the substrate and the visible light sources are located on the back surface of the substrate, and both sets of the light sources are arranged along the length direction of the substrate respectively on the front surface and back surface of the substrate. This configuration will enable the area where the infrared light sources are arranged and the area where the visible light sources are arranged to overlap or coexist along the length direction of the substrate without a need to increase a width or a length of the substrate in an undue fashion. When lighted, the infrared light sources disposed on the front surface of the substrate emit infrared light toward the driver via the radiating opening of the holding member. Further, although the visible light sources are disposed on the back surface of the substrate, visible light emitted from the visible light sources will be delivered toward the driver since the light guiding element which extends from the back surface side to the front surface side of the substrate via the gap between one of the side walls of the holding member and the substrate deflects the visible light toward the radiating opening. In the steering wheel configured as described above, moreover, since the light guiding element extending from the back surface side to the front surface side of the substrate helps secure a long optical path, the visible light emitted from the visible light sources is diffused inside the light guiding element sufficiently in the long optical path, thus is able to shine an entirety of a region where the light guiding element is disposed in a vicinity of the radiating opening in an even and steady fashion.

Therefore, according to the one aspect of the present disclosure, a light bar is formed compact in size in both width direction and length direction despite parallel use of the visible light sources and infrared light sources, and is smoothly mounted on the steering wheel.

In the steering wheel configured as described above, the light bar may further include a lens that is disposed over the infrared light sources in the front surface side of the substrate and configured to deflect the infrared light toward the driver. The lens will be able to increase a degree of freedom of arrangement of the infrared light sources since it can guide the infrared light emitted from the infrared light sources so that the infrared light is surely emitted toward the driver from the radiating opening.

In the steering wheel configured as described above, the light guiding element may include a diffusing layer configured to diffuse the visible light emitted from the visible light sources, either in an entrance plane for receiving the visible light or in an exit plane disposed toward the radiating opening for releasing the visible light. The diffusing layer will enable the visible light having entered into the light guiding element to exit from the exit plane in a further diffused state.

In the steering wheel configured as described above, the light guiding element may be formed to have a generally L cross-sectional shape by making its root portion in which the entrance plane is disposed protrude toward the visible light sources from a remaining portion of the light guiding element. This configuration will help secure a longer distance from the entrance plane to the exit plane of the light guiding element (i.e. longer optical path), thus the visible light entering from the entrance plane will be diffused further.

In the steering wheel configured as described above, the light bar may be formed into a curved shape elongated along a circumferential direction of the grip of the steering wheel and disposed in the grip. With this configuration, the driver gripping the grip is able to see the light bar easily while driving.

When the light bar is mounted on the grip of the steering wheel, the light bar may be configured such that the holding member is disposed to be brought into contact with a core of the grip and the substrate is configured such that a heat generating at operation of the substrate is transferred to the core via the holding member. This configuration will help dissipate the heat at lighting from the core of the grip.

A steering wheel according to another aspect of the present disclosure includes a light bar at a position visible to a driver. The light bar includes a holding member that includes a radiating opening; a substrate that is held by the holding member generally in parallel to an opening surface of the radiating opening, the substrate including a front surface facing towards the radiating opening and a back surface facing away from the radiating opening; a plurality of visible light sources that are mounted and arranged on the back surface of the substrate generally along a length direction of the substrate for emitting visible light when actuated; and a light guiding element that is configured to deflect the visible light emitted from the visible light sources toward the radiating opening so that the visible light is radiated from the radiating opening, the light guiding element including a light-source-side portion that is disposed in a vicinity of the visible light sources in a side of the back surface of the substrate, and an opening-side portion that intersects with the light-source-side portion and extends from the side of the back surface to a side of the front surface of the substrate, thus the light guiding element having a generally L cross-sectional shape.

In the steering wheel configured as described above, the light-source-side portion of the light guiding element extends along the substrate, instead of extending in perpendicular to the substrate. This configuration will help secure a long optical path even in an instance where the light bar does not have an enough space for allowing the light guiding element to extend perpendicularly to the substrate, in the back surface side of the substrate. In comparison with an instance where the visible light sources are disposed on the front surface of the substrate, therefore, the visible light emitted from the visible light sources will be diffused in the long optical path from the back surface side to the upper side of the substrate, thus is able to shine an entirety of a region where the light guiding element is disposed in a vicinity of the radiating opening in an even and steady fashion.

In the steering wheel configured as described above, the opening-side portion of the light guiding element may be disposed in a vicinity of a center in a width direction of the light bar. This configuration will make a central region in the width direction of the light bar shine at lighting of the visible light sources.

The steering wheel configured as described above may also be configured such that: the light bar has a curved shape elongated along a circumferential direction of a grip of the steering wheel and is disposed in an upper surface of the grip; the light guiding element has a curved shape extending generally along a curvature of the grip; and the light guiding element includes: a plurality of entrance planes each of which is disposed in the light-source-side portion so as to be opposed to a corresponding one of the visible light sources, each of the entrance planes having a prismatic structure; an exit plane disposed toward the radiating opening; and a plurality of deflecting planes each of which is disposed at a positon opposed to a corresponding one of the entrance planes in a vicinity of an intersection between the light-source-side portion and the opening-side portion, each of the deflecting planes being configured to deflect the visible light having entered from the corresponding entrance plane toward the exit plane.

With this configuration, the visible light emitted from each of the visible light sources is largely diffused by the corresponding entrance plane having a prismatic structure at entering into the light guiding element, then deflected toward the exit plane by the corresponding deflecting plane. That is, the visible light is further diffused inside the opening-side portion while being deflected by the deflecting plane, then emitted from the exit plane. Therefore, although the light guiding element is formed into an elongated shape curved along the curvature of the grip, the visible light will be largely diffused inside the light guiding element and uniformly make shine an entirety of the region where the light guiding element is disposed in a vicinity of the radiating opening.

What is claimed is:

1. A steering wheel comprising a light bar at a position visible to a driver, wherein:
   the light bar comprises:
   a holding member that includes a pair of side walls and a radiating opening formed between first end portions of the side walls;
   a substrate that is stored and held inside the holding member generally in parallel to an opening surface of the radiating opening in such a manner that a gap is formed between a first end in a width direction of the substrate and one of the side walls of the holding member, the substrate including a front surface facing towards the radiating opening and a back surface facing away from the radiating opening;
   a plurality of infrared light sources that are mounted and arranged on the front surface of the substrate generally along a length direction of the substrate for emitting infrared light toward the driver via the radiating opening when actuated;
   a plurality of visible light sources that are mounted and arranged on the back surface of the substrate generally along the length direction of the substrate for emitting visible light when actuated; and
   a light guiding element that is configured to deflect the visible light emitted from the visible light sources toward the radiating opening so that the visible light is radiated from the radiating opening, the light guiding element extending from a side of the back surface to a side of the front surface of the substrate via the gap.

2. The steering wheel of claim 1, wherein the light bar further comprises a lens that is disposed over the infrared light sources in the front surface side of the substrate and configured to deflect the infrared light toward the driver.

3. The steering wheel of claim 1, wherein the light guiding element includes a diffusing layer configured to diffuse the visible light emitted from the visible light sources, either in an entrance plane for receiving the visible light or in an exit plane disposed toward the radiating opening for releasing the visible light.

4. The steering wheel of claim 3, wherein the entrance plane is disposed in a root portion of the light guiding element which protrudes toward the visible light sources from a remaining portion of the light guiding element, thus the light guiding element has a generally L cross-sectional shape.

5. The steering wheel of claim 4, wherein:
the visible light sources are disposed in a vicinity of a second end in the width direction of the substrate, the second end being remote from the gap; and
the root portion of the light guiding element is disposed in proximity to the visible light sources.

6. The steering wheel of claim 1, wherein an entrance plane of the light guiding element for receiving the visible light emitted from the visible light sources is formed into a hollow shape having a generally arcuate sectional shape.

7. The steering wheel of claim 1, wherein the light bar has a curved shape elongated along a circumferential direction of a grip of the steering wheel and is disposed in the grip.

8. The steering wheel of claim 7, wherein:
the holding member is in contact with a core of the grip; and
the substrate is configured such that a heat generating at operation of the substrate is transferred to the core via the holding member.

9. The steering wheel of claim 1, wherein the infrared light sources and the visible light sources are disposed distant from each other in the width direction of the substrate.

10. A steering wheel comprising a light bar at a position visible to a driver, wherein:
the light bar comprises:
a holding member that includes a radiating opening;
a substrate that is held by the holding member generally in parallel to an opening surface of the radiating opening, the substrate including a front surface facing towards the radiating opening and a back surface facing away from the radiating opening;
a plurality of visible light sources that are mounted and arranged on the back surface of the substrate generally along a length direction of the substrate for emitting visible light when actuated; and
a light guiding element that is configured to deflect the visible light emitted from the visible light sources toward the radiating opening so that the visible light is radiated from the radiating opening, the light guiding element including a light-source-side portion that is disposed in a vicinity of the visible light sources in a side of the back surface of the substrate, and an opening-side portion that intersects with the light-source-side portion and extends from the side of the back surface to a side of the front surface of the substrate, thus the light guiding element having a generally L cross-sectional shape.

11. The steering wheel of claim 10, wherein the opening-side portion of the light guiding element is disposed in a vicinity of a center in a width direction of the light bar.

12. The steering wheel of claim 10, wherein:
the light bar has a curved shape elongated along a circumferential direction of a grip of the steering wheel and is disposed in an upper surface of the grip;
the light guiding element has a curved shape extending generally along a curvature of the grip; and
the light guiding element includes:
a plurality of entrance planes each of which is disposed in the light-source-side portion so as to be opposed to a corresponding one of the visible light sources, each of the entrance planes having a prismatic structure;
an exit plane disposed toward the radiating opening; and
a plurality of deflecting planes each of which is disposed at a positon opposed to a corresponding one of the entrance planes in a vicinity of an intersection between the light-source-side portion and the opening-side portion, each of the deflecting planes being configured to deflect the visible light having entered from the corresponding entrance plane toward the exit plane.

13. The steering wheel of claim 10, wherein:
the light bar further includes a cover that covers the radiating opening of the holding member;
a leading end portion of the opening-side portion for releasing the visible light is disposed in proximity to the cover; and
the cover includes a light-blocking layer in an entire back surface thereof except a region where the opening-side portion is disposed.

* * * * *